(12) United States Patent
Ye et al.

(10) Patent No.: US 10,200,763 B2
(45) Date of Patent: Feb. 5, 2019

(54) VIDEO-BASED INTERACTION METHOD, TERMINAL, SERVER AND SYSTEM

(71) Applicant: Tencent Technology (Shenzhen) Company Limited, Shenzhen, Guangdong (CN)

(72) Inventors: Wa Ye, Guangdong (CN); Hongyang Wang, Guangdong (CN); Jie Hou, Guangdong (CN); Zhenyu Xu, Guangdong (CN); Zhuo Tang, Guangdong (CN); Rui Wang, Guangdong (CN); Keren Li, Guangdong (CN); Jing Zang, Guangdong (CN); Bo Sun, Guangdong (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/266,684

(22) Filed: Sep. 15, 2016

(65) Prior Publication Data

US 2017/0085960 A1 Mar. 23, 2017

Related U.S. Application Data

(63) Continuation of application No. PCT/CN2015/080125, filed on May 28, 2015.

(30) Foreign Application Priority Data

May 30, 2014 (CN) .......................... 2014 1 0241073

(51) Int. Cl.
H04N 21/658 (2011.01)
H04N 21/475 (2011.01)
(Continued)

(52) U.S. Cl.
CPC ....... *H04N 21/658* (2013.01); *G06Q 30/0625* (2013.01); *H04N 21/233* (2013.01);
(Continued)

(58) Field of Classification Search
CPC ............. H04N 21/4722; H04N 21/478; H04N 21/4316; H04N 21/4782; H04N 21/4622;
(Continued)

(56) References Cited

U.S. PATENT DOCUMENTS 7,549,052 B2 * 6/2009 Haitsma ............ G06F 17/30787
380/54
2003/0051252 A1 3/2003 Miyaoku et al.
(Continued)

FOREIGN PATENT DOCUMENTS

CN 102843599 A 12/2012
CN 103402118 A 11/2013
(Continued)

OTHER PUBLICATIONS

Office Action dated Mar. 21, 2017 for Japanese Application No. 2016-550485, 15 pages.
(Continued)

*Primary Examiner* — Nathan J Flynn
*Assistant Examiner* — Cynthia M Fogg
(74) *Attorney, Agent, or Firm* — Morgan, Lewis & Bockius LLP

(57) ABSTRACT

The present disclosure discloses a video-based interaction method, a terminal, a server, and a system, and relates to the field of information processing technologies. The method includes: acquiring an interaction instruction; acquiring multi-media data related to a video according to the interaction instruction; sending the multi-media data; receiving at least one type of interaction page matching with the multi-media data, different interaction pages corresponding to (Continued)

different types of interaction operations; and displaying at least one type of interaction page, and implementing a corresponding type of interaction operation according to each type of interaction page.

9 Claims, 11 Drawing Sheets

(51) Int. Cl.

| | |
|---|---|
| H04N 21/478 | (2011.01) |
| H04N 21/8545 | (2011.01) |
| G06Q 30/06 | (2012.01) |
| H04N 21/233 | (2011.01) |
| H04N 21/254 | (2011.01) |
| H04N 21/414 | (2011.01) |
| H04N 21/422 | (2011.01) |
| H04N 21/439 | (2011.01) |
| H04N 21/4722 | (2011.01) |
| H04N 21/4788 | (2011.01) |
| H04N 21/482 | (2011.01) |
| H04N 21/81 | (2011.01) |
| H04N 21/84 | (2011.01) |
| H04N 21/845 | (2011.01) |

(52) U.S. Cl.
CPC ... *H04N 21/2542* (2013.01); *H04N 21/41407* (2013.01); *H04N 21/4222* (2013.01); *H04N 21/4394* (2013.01); *H04N 21/475* (2013.01); *H04N 21/4722* (2013.01); *H04N 21/4788* (2013.01); *H04N 21/47815* (2013.01); *H04N 21/4828* (2013.01); *H04N 21/812* (2013.01); *H04N 21/84* (2013.01); *H04N 21/845* (2013.01); *H04N 21/8545* (2013.01)

(58) Field of Classification Search
CPC ............ H04N 21/4788; H04N 21/233; H04N 21/2542; H04N 21/41407; H04N 21/4222; H04N 21/4394; H04N 21/475; H04N 21/47815; H04N 21/4828; H04N 21/812; H04N 21/84; H04N 21/845; H04N 21/8545; H04N 21/658; G06Q 30/06; G06Q 30/0625
USPC ......................................................... 725/31
See application file for complete search history.

(56) References Cited

U.S. PATENT DOCUMENTS

| | | | | |
|---|---|---|---|---|
| 2008/0119132 | A1* | 5/2008 | Rao | G06Q 30/02 455/3.04 |
| 2009/0320070 | A1 | 12/2009 | Inoguchi | |
| 2010/0232771 | A1* | 9/2010 | Prestenback | H04N 5/765 386/201 |
| 2011/0107215 | A1* | 5/2011 | Klappert | G06F 3/167 715/716 |
| 2011/0126258 | A1* | 5/2011 | Emerson | H04L 51/04 725/133 |
| 2011/0247042 | A1* | 10/2011 | Mallinson | G06F 17/30026 725/86 |
| 2012/0087633 | A1 | 4/2012 | Narahara et al. | |
| 2012/0315014 | A1* | 12/2012 | Shuster | G06F 17/30817 386/241 |
| 2013/0159467 | A1* | 6/2013 | Lundholm | H04L 65/00 709/219 |
| 2013/0198642 | A1* | 8/2013 | Carney | G06F 3/0484 715/738 |
| 2014/0173644 | A1* | 6/2014 | Ball | H04N 21/4826 725/14 |

FOREIGN PATENT DOCUMENTS

| | | |
|---|---|---|
| CN | 103501464 A | 1/2014 |
| CN | 103686427 A | 3/2014 |
| CN | 104023251 A | 9/2014 |
| CN | 104159159 A | 11/2014 |
| JP | 2001-092737 A | 4/2001 |
| JP | 2002-209204 A | 7/2002 |
| JP | 2003-204539 A | 7/2003 |
| JP | 2004-272664 A | 9/2004 |
| JP | 2005-102109 A | 4/2005 |
| JP | 2009-224819 A | 10/2009 |
| JP | 2010-087595 A | 4/2010 |
| JP | 2014-048876 A | 3/2014 |
| JP | 2014-099162 A | 5/2014 |
| WO | WO 2008-016031 A1 | 2/2008 |
| WO | WO2015/188630 A1 | 12/2015 |
| WO | WO2015/180672 A1 | 12/2016 |

OTHER PUBLICATIONS

International Search Report and Written Opinion received in PCT Application No. PCT/CN2015/080125 dated Sep. 2, 2015.
Concise English Explanation of Relevance for First Chinese Office Action received in Chinese Application No. 201410368190.2 dated Feb. 28, 2015 and.
State Intellectual Property Office of People's Republic of China Search Report received in Chinese Application No. 201410368190.2 dated Feb. 28, 2015.
English translation of the allowed claims in the granted Chinese Patent No. CN104159159B (Application No. 201410368190.2).
English Translation of the Notification on Grant of Patent Right for Invention from the State Intellectual Property Office of the People's Republic of China received in Application No. 201410368190.2 dated Jun. 1, 2015.
Office Action dated Aug. 15, 2017 for Japanese Application No. 2016-550485, 17 pages.

* cited by examiner

VIDEO-BASED INTERACTION METHOD, TERMINAL, SERVER AND SYSTEM

This application is a continuation of International Application No. PCT/CN2015/080125, filed on May 28, 2015, which claims priority to Chinese Patent Application No. 201410241073.X, filed on May 30, 2014. This application also makes reference to Chinese Patent Application No. 201410368190.2 (granted as CN104159159B and issued on Jun. 1, 2015) filed on Jul. 29, 2014, which claims priority to the same Chinese Patent Application No. 201410241073.X, filed on May 30, 2014. All of which are incorporated herein by reference in their entirety.

FIELD OF THE TECHNOLOGY

The present disclosure relates to the field of information processing technologies, and in particular, to a video-based interaction method, a terminal, a server, and a system.

BACKGROUND OF THE DISCLOSURE

A television medium usually adds an interactive session during broadcasting of a video including a broadcasted program to improve the audience rating of the program, improve the quality of the program, or the like. For example, at the same time of broadcasting the program video, description information for describing content such as interaction content and a way of participating in the interaction may be broadcasted; after acquiring the description information, a terminal interacting with it may acquire an interaction page according to the description information, and thereby implementing an interaction operation according to the interaction page. Therefore, how to perform interaction based on a video simply and quickly becomes a problem in urgent need to be solved.

Currently, there are two types of video-based interaction methods as follows:

In the first video-based interaction method, a terminal acquires an interaction instruction related to a video and input by a user by using an input device, and after the interaction instruction is sent, an interaction page matching with the interaction instruction is received and displayed, and an interaction operation is implemented according to the interaction page. One interaction instruction matches with one type of interaction page, and therefore, the received interaction page matching with the interaction instruction is one type of interaction page, and the interaction operation implemented according to the interaction page is also one type of interaction operation.

In the second video-based interaction method, an acquisition manner corresponding to an interaction identification related to a video is determined, an interaction identification is acquired according to the acquisition manner, after the interaction identification is sent, an interaction page matching with the interaction identification is received and displayed, and an interaction operation is implemented according to the interaction page. One interaction identification matches with one type of interaction page, and therefore, the received interaction page matching with the interaction identification is one type of interaction page, and the interaction operation implemented according to the interaction page is also one type of interaction operation.

In the first video-based interaction method, the interaction instruction is input by the user by using the input device, which increases the probability of causing an incorrect interaction instruction due to wrong input, thereby increasing the probability of interaction failure. In the second video-based interaction method, the interaction identification needs to be acquired by using an acquisition manner corresponding to the interaction identification, which increases the complexity of interaction. Moreover, the interaction page received by the first or the second video-based interaction method is the interaction page of one type, so that the interaction operation implemented according to the interaction page is one type of interaction operation, and therefore, the interaction manner is simple, and has a certain interaction limitation.

SUMMARY

Embodiments of the present disclosure provide a video-based interaction method, a terminal, a server, and a system. The technical solutions are described as follows.

In the first aspect, a video-based interaction method is provided. In the method, an interaction instruction is acquired; multi-media data related to a video according to the interaction instruction is acquired and sent. Then, at least one type of interaction page matching with the multi-media data is received and display. A corresponding type of interaction operation is implemented according to each type of interaction page. Different interaction pages correspond to different types of interaction operations.

In the second aspect, a video-based interaction method is provided. In the second aspect, a video-based interaction method is provided. In the method, multi-media data related to a video is acquired; at least one type of interaction page matching with the multi-media data is searched and sent. Different interaction pages correspond to different types of interaction operations.

In the third aspect, a video-based interaction method is provided. In the method, a terminal acquires an interaction instruction, and acquires multi-media data related to a video according to the interaction instruction, and sends the multi-media data to a server. The server acquires the multi-media data sent by the terminal, searches for at least one type of interaction page matching with the multi-media data, and returns the at least one type of interaction page to the terminal. Different interaction pages correspond to different types of interaction operations. Then, the terminal receives the at least one type of interaction page returned by the server, displays the at least one type of interaction page, and implements a corresponding type of interaction operation according to each type of interaction page.

In the fourth aspect, a terminal is provided. The terminal includes: a first acquiring module, configured to acquire an interaction instruction; a second acquiring module, configured to acquire multi-media data related to a video according to the interaction instruction acquired by the first acquiring module; a first sending module, configured to send the multi-media data acquired by the second acquiring module; a receiving module, configured to receive at least one type of interaction page matching with the multi-media data sent by the first sending module, different interaction pages corresponding to different types of interaction operations; a displaying module, configured to display the at least one type of interaction page received by the receiving module; and an implementing module, configured to implement a corresponding type of interaction operation according to each type of interaction page received by the receiving module.

In the fifth aspect, a server is provided. The server includes: a first acquiring module, configured to acquire multi-media data, the multi-media data being related to a video; a searching module, configured to search for at least one type of interaction page matching with the multi-media data acquired by the first acquiring module, different interaction pages corresponding to different types of interaction operations; and a sending module, configured to send the at least one type of interaction page found by the searching module.

In the sixth aspect, a video-based interaction system is provided, and the system includes: a terminal and a server, where the terminal is the terminal described in the fourth aspect; and the server is the server described in the fifth aspect.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

To make the technical solutions and advantages of the present disclosure clearer, implementation manners of the present disclosure are described in further detail with reference to the accompanying drawings.

Figure 1:
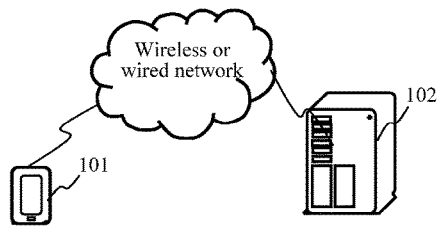
FIG. 1 is a schematic structural diagram of an implementation environment of a video-based interaction method according to an exemplary embodiment.

An embodiment of the present disclosure provides a video-based interaction method, and referring to FIG. 1, a schematic structural diagram of an implementation environment involved by a video-based interaction method according to the embodiment of the present disclosure. The implementation environment includes a terminal 101 and a server 102.

The terminal 101 is a terminal as described in the following embodiment. The terminal 101 is configured to: after acquiring multi-media data related to a video, send the multi-media data to the server 102, receive at least one type of interaction page matching with the multi-media data sent by the server 102, and implement a corresponding type of interaction operation according to each type of interaction page. In addition, the terminal 101 may be a smart phone, a remote control or a set-top box, or may be another form of device interacting with a television. Moreover, the device may be a device independent from the television, or a device integrated with the television, which is not limited in the embodiment of the present disclosure.

The server 102 is a server providing an interaction page for the terminal 101, and is a server as described in the following embodiment. After receiving the multi-media data related to the video sent by the terminal 101, the server 102 searches for and sends an interaction page matching with the multi-media data.

The terminal 101 and the server 102 may communicate with each other through a wireless network or a wired network.

Figure 2:
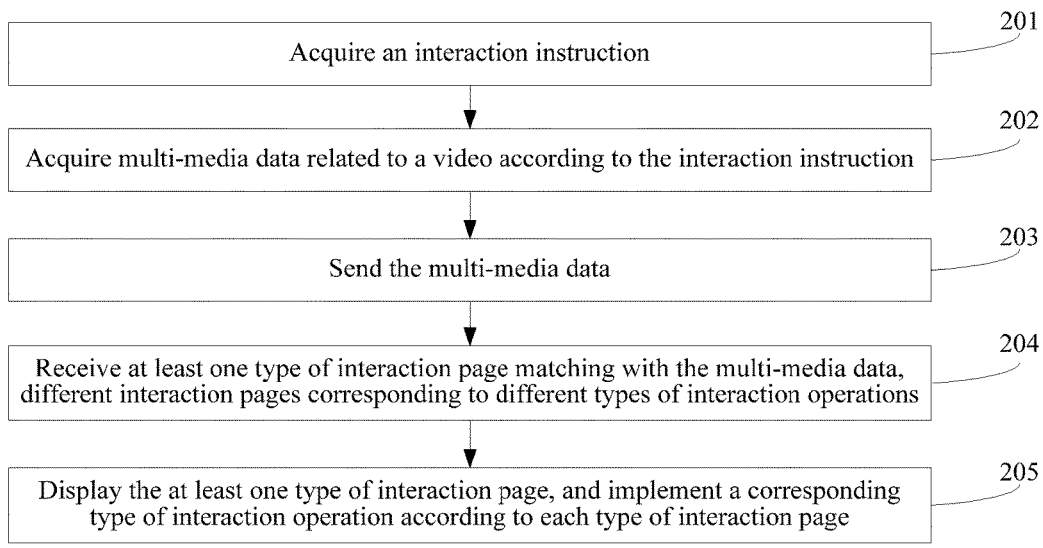
FIG. 2 is a flow chart of a first video-based interaction method according to an exemplary embodiment.

FIG. 2 is a flow chart of a video-based interaction method according to an exemplary embodiment. As shown in FIG. 2, the video-based interaction method is applied to a terminal, and includes the following steps.

201: Acquire an interaction instruction.

202: Acquire multi-media data related to a video according to the interaction instruction.

Optionally, the acquiring multi-media data related to a video according to the interaction instruction includes:

acquiring image data in the video according to the interaction instruction, and using the image data as the multi-media data related to the video.

Optionally, the acquiring multi-media data related to a video according to the interaction instruction includes:

acquiring audio data in the video according to the interaction instruction, and using the audio data as the multi-media data related to the video.

Optionally, the acquiring multi-media data related to a video according to the interaction instruction includes:

acquiring audio data in the video according to the interaction instruction, generating an audio fingerprint corresponding to the audio data, and using the audio fingerprint as the multi-media data related to the video.

203: Send the multi-media data.

204: Receive at least one type of interaction page matching with the multi-media data, different interaction pages corresponding to different types of interaction operations.

205: Display the at least one type of interaction page, and implement a corresponding type of interaction operation according to each type of interaction page.

Optionally, the method further includes:

determining time information of the interaction instruction, and sending the time information; and the receiving at least one type of interaction page matching with the multi-media data includes:

receiving at least one type of interaction page matching with the multi-media data and the time information.

Optionally, one type of interaction page is a voting page including at least two voting options; and the implementing a corresponding type of interaction operation according to each type of interaction page includes:

acquiring a voting result of the voting options according to the voting page, and sending the voting result.

Optionally, one type of interaction page is an interactive quiz page including at least two interactive quiz options; and the implementing a corresponding type of interaction operation according to each type of interaction page includes:

acquiring an interactive quiz result of the interactive quiz options according to the interactive quiz page, and sending the interactive quiz result.

Optionally, one type of interaction page is a lottery page including lottery information; and the implementing a corresponding type of interaction operation according to each type of interaction page includes:

acquiring a lottery result corresponding to the lottery information according to the lottery page, and displaying the lottery result.

Optionally, one type of interaction page is an answer page including an answer option or a text input box; and the implementing a corresponding type of interaction operation according to each type of interaction page includes:

acquiring an answer result of the answer option or an answer result input in the text input box according to the answer page, and sending the answer result of the answer option or the answer result input in the text input box.

Optionally, one type of interaction page is a comment page including to-be-commented content; and the implementing a corresponding type of interaction operation according to each type of interaction page includes:

acquiring comment information of the to-be-commented content according to the comment page, and sending the comment information.

Optionally, one type of interaction page is a shopping page including commodity description information; and the implementing a corresponding type of interaction operation according to each type of interaction page includes:

acquiring detailed information corresponding to the commodity description information according to the shopping page, and displaying the detailed information.

Optionally, one type of interaction page is a payment page including a payment option; and the implementing a corresponding type of interaction operation according to each type of interaction page includes:

acquiring payment information corresponding to the payment option according to the payment page, and performing a payment related operation according to the payment information.

Optionally, one type of interaction page is a chat page; and the implementing a corresponding type of interaction operation according to each type of interaction page includes:

acquiring chat information according to the chat page, and sending the chat information.

Optionally, one type of interaction page is an information displaying page; and the implementing a corresponding type of interaction operation according to each type of interaction page includes:

displaying a picture, a text, a video, or image-text information according to the information displaying page.

Figure 3:
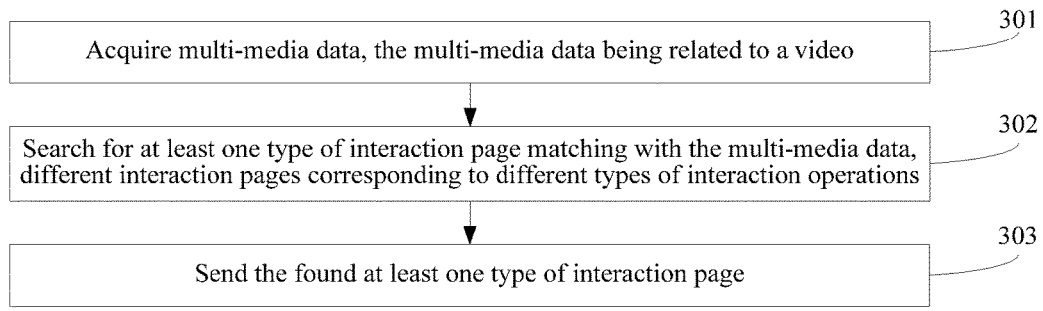
FIG. 3 is a flow chart of a second video-based interaction method according to an exemplary embodiment.

FIG. 3 is a flow chart of another video-based interaction method according to an exemplary embodiment. As shown in FIG. 3, the video-based interaction method is applied to a server, and includes the following steps.

301: Acquire multi-media data, the multi-media data being related to a video.

302: Search for at least one type of interaction page matching with the multi-media data, different interaction pages corresponding to different types of interaction operations.

Optionally, the multi-media data is image data related to a video; and the searching for at least one type of interaction page matching with the multi-media data includes:

searching for at least one type of interaction page matching with the image data.

Optionally, the multi-media data is audio data related to a video; and the searching for at least one type of interaction page matching with the multi-media data includes:

generating an audio fingerprint according to the audio data, and searching for at least one type of interaction page matching with the audio fingerprint.

Optionally, the multi-media data is an audio fingerprint related to a video; and the searching for at least one type of interaction page matching with the multi-media data includes:

searching for at least one type of interaction page matching with the audio fingerprint.

303: Send the found at least one type of interaction page.

Optionally, the method further includes: acquiring time information; and the searching for at least one type of interaction page matching with the multi-media data includes:

searching for at least one type of interaction page matching with the multi-media data and the time information.

Optionally, the interaction page is one type of page including a voting page including at least two voting options, an interactive quiz page including at least two interactive quiz options, a lottery page including lottery information, an answer page including an answer option or as text input box, a comment page including to-be-commented content, as shopping page including commodity description information, a payment page including a payment option, a chat page, and an information displaying page.

In the method provided in this embodiment, by acquiring and sending multi-media data related to a video, receiving and displaying each type of interaction page matching with the multi-media data, and implementing a corresponding type of interaction operation according to each type of interaction page, an interaction failure caused by incorrectly input interaction instruction may be avoided, and at the same time, the situation of increasing the interaction complexity due to acquiring an interaction identification by using an acquisition manner corresponding to the interaction identification is also avoided. Not only the success rate of interaction is improved, the interaction complexity is reduced, but also the processing manner of interaction is more flexible. Moreover, content included in the multi-media data is abundant, and there are various types of interaction pages matching with the multi-media data; therefore, interaction operations implemented according to the interaction pages are diversified, thereby enriching the interaction experience.

To describe a video-based interaction method provided in the above embodiment more clearly, the video-based interaction method is described in detail by using the following embodiment as an example in combination with the content and implementation environment of the above embodiment. Details may be seen in the following embodiment.

Figure 4:
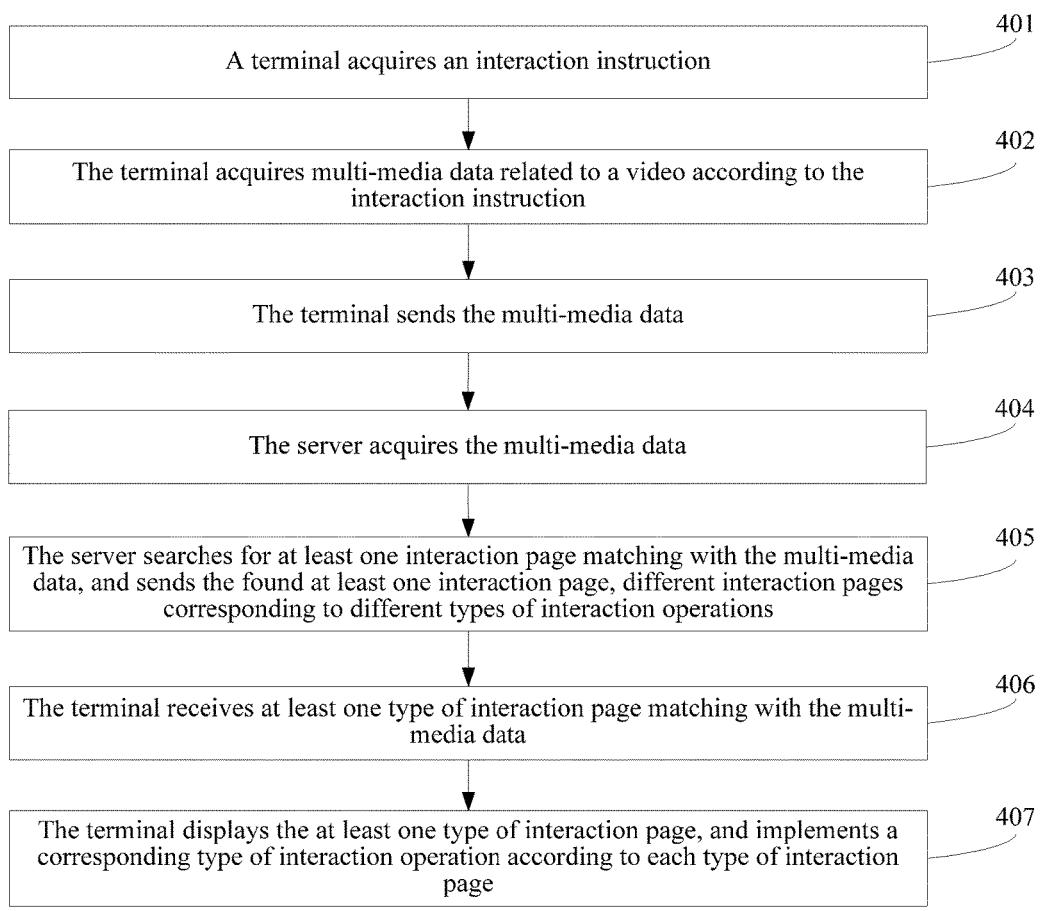
FIG. 4 is a flow chart of a third video-based interaction method according to an exemplary embodiment.

FIG. 4 is a flow chart of a video-based interaction method according to an exemplary embodiment. To facilitate the description, in this embodiment, a terminal being a mobile phone A and a server being a server A is used as an example to describe the method provided in this embodiment in detail. Referring to FIG. 4, the process of the method provided in this embodiment specifically includes:

401: A terminal acquires an interaction instruction.

The specific method for the terminal to acquire the interaction instruction is not limited in this embodiment, and includes, but is not limited to: if the terminal detects a shake action, it is considered that an interaction instruction is acquired.

A specific determination condition of whether the terminal detects a shake action is not limited in this embodiment, and includes, but is not limited to: if the terminal includes a position sensor, whether a gravity position of the terminal changes is detected by using the position sensor, and if it is detected by the position sensor that the gravity position of the terminal changes, it is determined that the terminal detects a shake action.

In addition to the method for acquiring the interaction instruction, the specific method for acquiring the interaction instruction may also be: if the terminal detects a preset fingerprint, it is considered that an interaction instruction is acquired. Or, if the terminal detects a preset audio signal, it is considered that an interaction instruction is acquired. Or if the terminal detects a preset password, it is considered that an interaction instruction is acquired.

In addition, to prevent another function instruction from being considered as the interaction instruction in the method provided in this embodiment when the interaction instruction provided in the method of this embodiment is the same as the another function instruction of the terminal, optionally, the terminal acquires the interaction instruction after acquiring that an interaction instruction triggering condition is triggered. The specific method of triggering the interaction instruction triggering condition is not limited in this embodiment. For example, if an interaction function is started, it is considered that the interaction instruction triggering condition is triggered.

The specific method of starting the interaction function is not limited in this embodiment either. For example, if the terminal provides multiple function options and one function option among them is an interaction function option, when the terminal acquires that the interaction function option is selected, it is considered that the interaction function is started.

Figure 5:
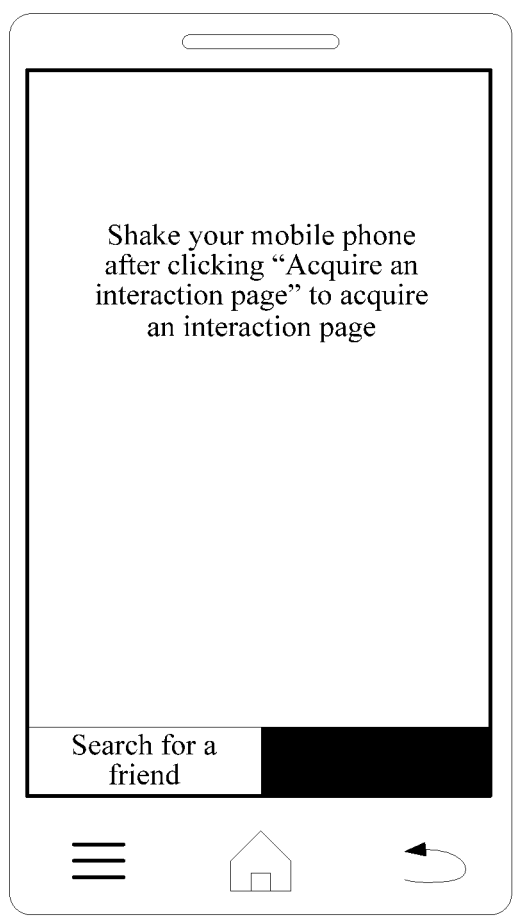
FIG. 5 is a schematic diagram of an operation interface of a mobile phone according to an exemplary embodiment.

By using an operation interface of the mobile phone A shown in FIG. 5 as an example, the mobile phone A provides two function options, that is, a making-friend function option "search for a friend" and an interaction function option "acquire an interaction page". If the mobile phone A acquires that "acquire an interaction page" is selected, it is considered that an interaction function is started. After the interaction function is started, if the mobile phone A detects, by using a position sensor included therein, that a gravity position of the mobile phone A changes, it is determined that the mobile phone A detects a shake action, and it is considered that an interaction instruction is acquired.

402: The terminal acquires multi-media data related to a video according to the interaction instruction.

The specific method of acquiring the multi-media data related to the video according to the interaction instruction is not limited in this embodiment. For example, image data in the video is acquired according to the interaction instruction, and the image data is used as the multi-media data related to the video. Or, audio data in the video is acquired according to the interaction instruction, and the audio data is used as the multi-media data related to the video. Or, audio data in the video is acquired according to the interaction instruction, an audio fingerprint corresponding to the audio data is generated, and the audio fingerprint is used as the multi-media data related to the video.

The step of acquiring the image data in the video according to the interaction instruction is not specifically limited in this embodiment, and includes, but is not limited to: after the terminal acquires the interaction instruction, acquiring the image data of the video at the same time of playing the video by a video playing device. The specific manner of acquiring the image data of the video includes, but is not limited to: collecting, by the terminal, image data of the video every a first preset time period, until a total time length of the collected image data reaches a first preset length. In addition, the video playing device is also not limited in this embodiment, and includes, but is not limited to, a video playing device such as a television and a notebook computer.

Example 1: by using the video playing device being a television as an example, if a first preset time period is 3 seconds, as first preset time length is 15 seconds, and the time length of collected image data each time is 3 seconds, the mobile phone A collects, at 10:30:30 to 10:30:33, television image data 1 of as video being played by the television at 10:30:30 to 10:30:33, and uses the television image data 1 as image data 1 collected the first time, and in this case, a total time length of the collected image data is 3 seconds.

The mobile phone A collects, at 10:30:33 to 10:30:36, television image data 2 of the video being played by the television at 10:30:33 to 10:30:16, and uses the television image data 2 as image data 2 collected the second time, and in this case, a total time length of the collected image data is 6 seconds.

The mobile phone A collects, at 10:30:36 to 10:30:39, television image data 3 of the video being played by the television at 10:30:36 to 10:30:39, and uses the television image data 3 as image data 3 collected the third time, and in this case, a total time length of the collected image data is 9 seconds.

The mobile phone A collects, at 10:30:39 to 10:30:42, television image data 4 of the video being played by the television at 10:30:39 to 10:30:42, and uses the television image data 4 as image data 4 collected the fourth time, and in this case, a total time length of the collected image data is 12 seconds.

The mobile phone A collects, at 10:30:42 to 10:30:45, television image data 5 of the video being played by the television at 10:30:42 to 10:30:45, and uses the television image data 5 as image data 5 collected the fifth time, and in this case, a total time length of the collected image data is 15 seconds.

The television image data may include, but not limited to, a picture or a video of a television program being played in the video, and may also include a picture of a station caption of a TV station to which the television program being played in the video belongs, or the like.

Definitely, the video playing device may also be another device, the first preset time period may also be another time length, the first preset time length may also be another time length, the time length of image data collected each time may also be another time length, a name of the collected image data may also be another name, and the specific video playing device, the specific value of the first preset time period, the specific value of the first preset time length, the specific time length of the image data collected each time, and the specific name of the collected image data are not limited in this embodiment.

In addition to the above method, the specific method of acquiring the image data of the video may further be that the terminal merely collects image data for once.

Example 2: by using the video playing device being a television as an example, if a time length of collected image data is 3 seconds, the mobile phone A collects, at 10:30:30 to 10:30:33, television image data 6 of a video being played by the television at 10:30:30 to 10:30:33, and uses the television image data 6 as collected image data 6.

The step of acquiring the audio data in the video according to the interaction instruction is not specifically limited in this embodiment, and includes, but is not limited to: after the terminal acquires the interaction instruction, acquiring the audio data of the video at the same time of playing the video by a video playing device. The specific manner of acquiring the audio data of the video includes, but is not limited to: collecting, by the terminal, audio data of the video every a second preset time period, until a total time length of the collected audio data reaches a second preset length.

Example 3: by using the video playing device being a television as an example, if a second preset time period is 3 seconds, a second preset time length is 15 seconds, and the time length of collected audio data each time is 3 seconds, the mobile phone A collects, at 10:30:30 to 10:30:33, television audio data 1 of a video being played by the television at 10:30:30 to 10:30:33, and uses the television audio data 1 as audio data 1 collected the first time, and in this case, a total time length of the collected audio data is 3 seconds.

The mobile phone A collects, at 10:30:33 to 10:30:36, television audio data 2 of the video being played by the television at 10:30:33 to 10:30:30, and uses the television audio data 2 as audio data 2 collected the second time, and in this case, a total time length of the collected audio data is 6 seconds.

The mobile phone A collects, at 10:30:36 to 10:30:39, television audio data 3 of the video being played by the television at 10:30:36 to 10:30:39 and uses the television audio data 3 as audio data 3 collected the third time, and in this case, a total time length of the collected audio data is 9 seconds.

The mobile phone A collects, at 10:30:39 to 10:30:42, television audio data 4 of the video being played by the television at 10:30:39 to 10:30:42 and uses the television audio data 4 as audio data 4 collected the fourth time, and in this case, a total time length of the collected audio data is 12 seconds.

The mobile phone A collects, at 10:30:42 to 10:30:45, television audio data 5 of the video being played by the television at 10:30:42 to 10:30:45, and uses the television audio data 5 as audio data 5 collected the fifth time, and in this case, a total time length of the collected audio data is 15 seconds.

The television audio data is a carrier of frequency and amplitude change information of regular sound waves, of a television program being played in the video, including voice, music and effects.

Definitely, the second preset time period may also be another time length, the second preset time length may also be another time length, the time length of audio data collected each time may also be another time length, a name of the collected audio data may also be another name, and the specific value of the second preset time period, the specific value of the second preset time length, the specific time length of the audio data collected each time, and the specific name of the collected audio data are not limited in this embodiment. The length of the second preset time and the length of the first preset time may be the same or different, and whether the length of the second preset time is the same as the length of the first preset time is not limited in this embodiment.

In addition to the above method, the specific method of acquiring the audio data of the video may further be that the terminal merely collects audio data for once.

Example 4: by using the video playing device being a television as an example, if a time length of collected audio data is 3 seconds, the mobile phone A collects, at 10:30:30 to 10:30:33, television audio data 6 of a video being played by the television at 10:30:30 to 10:30:33, and uses the television audio data 6 as collected audio data 6.

The steps of generating the audio fingerprint corresponding to the audio data include, but not limited to: if a correspondences between each piece of preset audio data and a corresponding identification is pre-stored, acquiring an identification corresponding to the acquired audio data according to the relationship between each piece of preset audio data and the acquired audio data and according to the pre-stored correspondence between each piece of preset audio data and the corresponding identification, and using the identification corresponding to the acquired audio data as an audio fingerprint corresponding to the audio data.

The relationship between any piece of preset audio data and the acquired audio data may be one of the following four relationships:

The first relationship: any piece of preset audio data is unrelated to the acquired audio data;

The second relationship: any piece of preset audio data completely includes the acquired audio data;

The third relationship: any piece of preset audio data partially includes the acquired audio data; and The fourth relationship: any piece of preset audio data is completely included in the acquired audio data.

The following is used as an example: the preset audio data is 3 pieces of preset audio data, respectively being preset audio data 1, preset audio data 2 and preset audio data 3, a pre-stored correspondence between each piece of preset audio data and a corresponding identification is shown in Table 1, and the acquired audio data is television audio data 1.

TABLE 1

| Preset audio data | Corresponding identification |
| --- | --- |
| Preset audio data 1 | ID1 (identity) |
| Preset audio data 2 | ID2 |
| Preset audio data 3 | ID3 |

If the preset audio data 1 partially includes the television audio data 1, and the preset audio data 2 and the preset audio data 3 are unrelated to the television audio data 1, it is determined that the identity corresponding to the television audio data 1 is the identity ID1 corresponding to the preset audio data 1, and ID 1 is used as an audio fingerprint corresponding to the television audio data 1.

If the preset audio data 2 completely includes the television audio data 1, and the preset audio data 1 and the preset audio data 3 are unrelated to the television audio data 1, it is determined that the identity corresponding to the television audio data 1 is the identity ID2 corresponding to the preset audio data 2, and ID 2 is used as an audio fingerprint corresponding to the television audio data 1.

If the preset audio data 2 is completely included in the television audio data 1, and the preset audio data 1 and the preset audio data 3 are unrelated to the television audio data 1, it is determined that the identity corresponding to the television audio data 1 is the identity ID 2 corresponding to the preset audio data 2, and ID 2 is used as an audio fingerprint corresponding to the television audio data 1.

If the preset audio data 2 partially includes the television audio data 1, the preset audio data partially includes the preset audio data 3, and the preset audio data 1 is unrelated to the television audio data 1, it is determined that the identity corresponding to the television audio data 1 is the identity ID 2 corresponding to the preset audio data 2 and the identity ID 3 corresponding to the preset audio data 3, and ID 2 and ID 3 are used as an audio fingerprint corresponding to the television audio data 1.

Definitely, the number of preset audio data may also be another number, the name of preset audio data may also be another name, the correspondence between pre-stored each piece of audio data and a corresponding identity may be another correspondence, and the relationship between the preset audio data 1 and the television audio data 1, the relationship between the preset audio data 2 and the television audio data 1 and the relationship between the preset audio data 3 and the television audio data 1 may also be other relationships. In this embodiment, the specific number of preset audio data, the specific name of the preset audio data, the specific correspondence between pre-stored each piece of preset audio data and a corresponding identity, the specific relationship between the preset audio data 1 and the television audio data 1, the specific relationship between the preset audio data 2 and the television audio data 1, and the specific relationship between the preset audio data 3 and the television audio data 1 are not limited.

In addition to the above method of generating the audio fingerprint corresponding to the audio data, the method of generating the audio fingerprint corresponding to the audio data may further be: converting the audio data into a symbol sequence formed by specific symbols, and using the symbol sequence as an audio fingerprint corresponding to the audio data.

403: The terminal sends the multi-media data.

The specific method of the terminal sending the multi-media data is not limited in this embodiment. For example, if the terminal acquires the multi-media data every a first preset time period or second preset time period, the terminal sends the acquired multi-media data after acquiring the multi-media data every the first preset time period or second preset time period.

By using the example 3 in step 402 and the multi-media data being the audio data as an example, because the mobile phone A collects the audio data 1 at 10:30:30 to 10:30:33, collects the audio data 2 at 10:30:33 to 10:30:36, collects the audio data 3 at 1030:36 to 10:30:39, collects the audio data 4 at 10:30:39 to 10:30:42, collects the audio data 5 at 10:30:42 to 10:30:45, the mobile phone sends the audio data 1, the audio data 2, the audio data 3, the audio data 4 and the audio data 5 in sequence every 3 seconds.

In addition, to reflect time information of the multi-media data more accurately, optionally, the method of the terminal sending the multi-media data may also be: if the terminal acquires the multi-media data every the first preset time period or second preset time period, the terminal sends the multi-media data and acquires time information of the multi-media data after acquiring the multi-media data every the first preset time period or second preset time period.

Still using the example 3 in step 402 and the multi-media data being the audio data as an example, because the mobile phone A collects the audio data 1 at 10:30:30 to 10:30:33, collects the audio data 2 at 10:30:33 to 10:30:36, collects the audio data 3 at 10:30:36 to 10:30:19, collects the audio data 4 at 10:30:39 to 10:30:42, collects the audio data 5 at 10:30;42 to 10:30:45, time information of collecting the audio data 1 is 10:30:30 to 10:30:33, time information of collecting the audio data 2 is 10:30:33 to 10:30:36, time information of collecting the audio data 3 is 10:30:36 to 10:30:39, time information of collecting the audio data 4 is 10:30:39 to 10:30:42, and time information of collecting the audio data 5 is 10:30:42 to 10:30:45. The mobile phone A sends, every 3 seconds, the audio data 1 and 10:30:30 to 10:30:33, the audio data 2 and 10:30:33 to 10:30:36, the audio data 3 and 10:30:36 to 10:30:39, the audio data 4 and 10:30:39 to 10:30:42 and the audio data 5 and 10:30:42 to 10:30:45.

In addition to the method of the terminal sending the multi-media data, if the terminal merely acquire the multi-media data for once, the method of the terminal sending the multi-media data may further be that the terminal sends the multi-media data merely after acquiring the multi-media data. Or, the terminal sends the multi-media data and time information of acquiring the multi-media data merely after acquiring the multi-media data.

By using example 4 in step 402 and the multi-media data being the audio data as an example, the mobile phone A collects the audio data 6 at 10:30:30 to 10:30:33, and therefore, the mobile phone A sends the audio data 6. Or, the mobile phone A sends the audio data 6 and 10:30:30 to 10:30:33.

In addition, for the situation that the terminal merely collects audio data for once, to avoid sending failure due to a network problem or other problems when the terminal sends the multi-media data in step 403, the method of the terminal sending the multi-media data may further be that: the terminal sends the same multi-media data every a third preset time period. Or, the terminal sends, every the third preset time period, the same multi-media data and time information of acquiring the multi-media data.

Still by using example 4 in step 402 and the multi-media data being the audio data as an example, if the third preset time period is 3 seconds, the mobile phone A collects the audio data 6 at 10:30:30 to 10:30:33, and therefore, the mobile phone A sends the audio data 6 every 3 seconds. Or, the mobile phone A sends the audio data 6 and 10:30:30 to 10:30:33 every 3 seconds.

Definitely, the third preset time period may also be another time length, and the specific value of the third preset time period is not limited in this embodiment. The third preset time period may be the same as or different from the first preset time period in step 402, and the relationship between the third preset time period and the first preset time period is not limited in this embodiment. The third preset time period may be the same as or different from the second preset time period in step 402, and the relationship between the third preset time period and the second preset time period is not limited in this embodiment.

Moreover, the video played by the video playing device is related to a playing time, and the multi-media data related to the video is related to the time of acquiring the multi-media data; therefore, the acquiring the multi-media data related to the video according to the interaction instruction is related to the time of acquiring the interaction instruction. Optionally, after acquiring the interaction instruction, the method provided in this embodiment may further determine time information of the interaction instruction and send the time information.

The method of sending the time information is not limited in this embodiment. For example, the time information is sent at the same time of sending the multi-media data.

404: The server acquires the multi-media data.

The multi-media data is related to the video; the specific method of the server acquiring the multi-media data changes along with the change of the method of sending the multi-media data, and the specific method of the server acquiring the multi-media data is not limited in this embodiment, including, but not limited to, if the method of sending the multi-media data is that: the terminal sends the acquired multi-media data after acquiring the multi-media data every the first preset time period or second preset time period, the method of the server acquiring the multi-media data is that: the server acquires the multi-media data every the preset time period or second preset time period.

If the method of sending the multi-media data is that: the terminal sends the acquired multi-media data merely after acquiring the multi-media data for once, the method of the server acquiring the multi-media data is that: the server acquires the multi-media data merely for once.

405: The server searches for at least one interaction page matching with the multi-media data, and sends the found at least one interaction page, different interaction pages corresponding to different types of interaction operations.

Specifically, if the multi-media data is image data related to the video, at least one interaction page matching with the image data is searched for. If the multi-media data is audio data related to the video, an audio fingerprint is generated according to the audio data, and at least one interaction page matching with the audio fingerprint is searched for. Specifically, if the multi-media data is audio fingerprint related to the video, at least one interaction page matching with the audio fingerprint is searched for.

The specific method of searching for the at least one interaction page matching with the multi-media data is not limited in this embodiment, including, but not limited to, acquiring program information matching with the multi-media data, and acquiring at least one interaction page matching with the program information. The program information at least includes an audio signal of a program matching with the audio fingerprint, a name, and play time information.

The specific method of acquiring the program information matching with the multi-media data is not limited in this embodiment. For example, if the server stores program information of each program and such as multi-media data, a program name and playing information, the program information matching with the multi-media data is acquired according to the stored program information of each program and such as the multi-media data, the program name and the playing information. If a signal providing device stores multi-media data of each program and program information such as a program name and playing information, the multi-media data may be sent to the signal providing device, and program information matching with the multi-media data returned from the signal providing device is received.

By using that the signal providing device stores the program information of each program and such as the multi-media data, the program name and the playing information and the server A acquires image data 1 of the multi-media data as an example, the server A sends the image data 1 to the signal providing device, and receives program information 1 matching with the image data 1 returned by the signal providing device, the program information 1 being an audio signal of a television program A played by a television station A, the television program A, and 10:00:00 to 11:00:00.

Definitely, the name of the program information may also be another name, the program information may also be other content, and the specific name of the program information and the specific content of the program information are not limited in this embodiment.

The specific method of acquiring the at least one interaction page matching with the program information is not limited in this embodiment, including, but not limited to, if the server pre-stores a correspondence between the program information and an interaction page, acquiring, by the server, at least one interaction page matching with the program information according to the pre-stored correspondence between the program information and the interaction page.

By using that the server A pre-stores the correspondence between program information and an interaction page shown in Table 2 and the program information is program information 1 as an example, the server A may acquire, according to Table 2, interface pages matching with the program information 1, that is, an interaction page 2 and an interaction page 3.

TABLE 2

| Program information | Interaction page |
|---|---|
| Program information 1 | Interaction page 2 and interaction page 3 |
| Program information 2 | Interaction page 1 |
| . . . | . . . |

In addition, the specific method of the server pre-storing the correspondence between the program information and the interaction page is not limited in this embodiment. For example, the server collects program information in advance, and determines an interaction page corresponding to the program information; and the server stores a correspondence between the program information and the interaction page according to the interface page corresponding to the program information.

For example, there are 2 pieces of program information collected by the server A in advance, namely program information 1: an audio signal of a television program A played by a television station A, the television program A and 10:00:00 to 11:00:00, and program information 2: an audio signal of a television program B played by a television station B, the television program B and 11:00:00 to 12:00:00. It is determined that there are 2 interaction pages corresponding to the program information 1, namely the interaction page 2 and the interaction page 3. It is determined that there are 1 interaction page corresponding to the program information 2, that is, the interaction page 1. The correspondence between program information and an interaction page stored by the server A according to the interaction page corresponding to the program information is shown in Table 2.

Definitely, the number of program information collected in advance may be another number, the number of interaction pages corresponding to the program information may also be another number, the name of the interaction page corresponding to the program information may also be another name, the form of storing the correspondence between the program information and the interaction page may also be another form, and the specific number of program information collected in advance, the specific number of interaction pages corresponding to the program information, the specific name of the interaction page corresponding to the program information, and the specific form of storing the correspondence between the program information and the interaction page are not limited in this embodiment.

It should be noted that, when the method provided in this embodiment is implemented, the server does not need to pre-store the correspondence between the program information and the interaction page every time, that is, the correspondence between the program information and the interaction page is pre-stored merely when the interaction page is acquired by using the method provided in this embodiment for the first time. However, when the program information is changed, or the interaction page corresponding to the program information is changed, that is, when the correspondence between the program information and the interaction page needs to be updated, the step of storing the correspondence between the program information and the interaction page may be implemented again. Or, the step of storing the correspondence between the program information and the interaction page may be implemented again every a fourth preset time period, so as to update the stored correspondence between the program information and the interaction page. The fourth preset time period may be any time length, and the specific value of the fourth preset time period is not limited in this embodiment, and the specific condition of triggering implementation of the step of storing the correspondence between the program information and the interaction page again is also not limited in this embodiment.

In addition, the server may acquire multiple pieces of multi-media data in step 404, and therefore, in step 405, the server acquires an interaction page corresponding to multi-media data each time the multi-media data is acquired.

By using the multi-media data acquired by the server A being an audio fingerprint as an example: the server A acquires an interaction page matching with ID1 after acquiring ID1. The server A acquires an interaction page matching with ID2 after acquiring ID2. The server A acquires an interaction page matching with ID3 after acquiring ID3. The server A acquires an interaction page matching with ID4 after acquiring ID4. The server A acquires an interaction page matching with ID5 after acquiring ID5.

Moreover, if the terminal further sends time information in addition to sending the multi-media data, the server also receives the time information in addition to receiving the multi-media data. In this case, the method of searching for an interaction page matching with the multi-media data may also be: searching for an interaction page matching with the multi-media data and the time information.

The specific method of searching for the at least one interaction page matching with the multi-media data and the time information is not limited in this embodiment, including, but not limited to, acquiring program information matching with the multi-media data, and acquiring at least one interaction page matching with the program information and the time information.

The specific method of acquiring the at least one interaction page matching with the program information and the time information is not limited in this embodiment, including, but not limited to, if the server pre-stores a correspondence between the program information, the time information and interaction page, acquiring, by the server, at least one interaction page matching with the program information and the time information according to the pre-stored correspondence between the program information, the time information and the interaction page.

By using that the server A pre-stores the correspondence between program information, the time information and an interaction page shown in Table 3, the program information is program information 1, and the time information is 10:30:30 as an example, the server A may acquire, according to Table 3, interface pages matching with the program information 1 and 10:30:30, that is, interaction page 2 and an interaction page 3.

TABLE 3

| Program information | Time information | Interaction page |
| --- | --- | --- |
| Program information 1 | 10:00:00 to 10:30:00 | Interaction page 1 |
| Program information 1 | 10:30:00 to 11:00:00 | Interaction page 2 and interaction page 3 |
| Program information 2 | 11:00:00 to 12:00:00 | Interaction page 4 |

In addition, the specific method of the server pre-storing the correspondence between the program information, the time information and the interaction page is not limited in this embodiment. For example, the server collects program information in advance, and determines time information and an interaction page corresponding to the program information; and the server stores a correspondence between the program information, the time information and the interaction page according to the time information and the interface page corresponding to the program information.

For example, there are 2 pieces of program information collected by the server A in advance, namely program information 1: an audio signal of a television program A played by a television station A, the television program A and 10:00:00 to 11:00:00, and program information 2: an audio signal of a television program B played by a television station B, the television program B and 11:00:00 to 12:00:00. It is determined that there are 2 pieces of time information corresponding to the program information 1, namely 10:00:00 to 10:30:00 and 10:30:00 to 11:00:00. An interaction page corresponding to the program information 1 and 10:00:00 to 10:30:00 is the interaction page 1, and there are 2 interaction pages corresponding to the program information 1 and 10:30:00 to 11:00:00, namely, the interaction page 2 and the interaction page 3. It is determined that there is 1 piece of time information corresponding to the program information 2, that is, 11:00:00 to 12:00:00. An interaction page corresponding to the program information 2 and 11:00:00 to 12:00:00 is the interaction page 4. The correspondence between program information, the time information and an interaction page stored by the server A according to the time information and the interaction page corresponding to the program information is shown in Table 3.

Definitely, the number of time information corresponding to the program information may also be another number, the content of the time information corresponding to the program information may also be other content, and the specific number of time information corresponding to the program information and the specific content of time information corresponding to the program information are not limited in this embodiment.

It should be noted that, when the method provided in this embodiment is implemented, the server does not need to pre-store the correspondence between the program information, the time information and the interaction page every time, that is, the correspondence between the program information, the time information and the interaction page is pre-stored merely when the interaction page is acquired by using the method provided in this embodiment for the first time. However, when the program information is changed, or the time information or interaction page corresponding to the program information is changed, that is, when the correspondence between the program information, the time information and the interaction page needs to be updated, the step of storing the correspondence between the program information, the time information and the interaction page may be implemented again. Or, the step of storing the correspondence between the program information, the time information and the interaction page may be implemented again every a fifth preset time period, so as to update the stored correspondence between the program information, the time information and the interaction page. The fifth preset time period may be any time length, and the specific value of the fifth preset time period is not limited in this embodiment, and the specific condition of triggering implementation of the step of storing the correspondence between the program information, the time information and the interaction page again is also not limited in this embodiment. The length of the fifth preset time period and the length of the fourth preset time period may be the same or different, and a relationship between the length of the fifth preset time period and the length of the fourth preset time period is not limited in this embodiment.

In addition, according to different content included in the multi-media data, specific matching interaction pages are different, and the interaction page is one type of page including a voting page including at least two voting options, an interactive quiz page including at least two interactive quiz options, a lottery page including lottery information, an answer page including an answer option or a text input box, a comment page including to-be-commented content, a shopping page including commodity description information, a payment page including a payment option, a chat page, and an information displaying page.

Specifically, if the multi-media data includes related content related to voting, the matching interaction page is a voting page including at least two voting options. If the multi-media data includes related content related to interactive quiz, the matching interaction page is an interactive quiz page including at least two interactive quiz options. If the multi-media data includes related content related to lottery, the matching interaction page is a lottery page including lottery information. If the multi-media data includes related content related to answer, the matching interaction page is an answer page including an answer option or a text input box. It the multi-media data includes related comment content related to certain to-be-commented content, the matching interaction page is a comment page including the to-be-commented content. If the video being played currently includes a hat, and the acquired multi-media data may include related content related to the commodity, the matching interaction page is a shopping page including the commodity description information. If the video being played currently includes an advertisement of a certain commodity, and the acquired multi-media data includes related content related to payment, the matching interaction page is a payment page including a payment option. If the multi-media data is an audio signal acquired according to voice of a certain public person or the multi-media data is image data acquired according to a video of the public person, according to identification of the multi-media data, the matching interaction page may be a chat page based on a public ID of the public person. If the multi-media data includes related content related to displaying information, the matching interaction page is an information displaying page.

It should be noted that, if the multi-media data includes two or more types of content related to voting, interactive quiz, lottery, answer, a certain to-be-commented related comment content, related content of as commodity, an advertisement of a commodity, an audio signal acquired according to voice of a certain public person, image data of a certain public person, and related content of displaying, there are several types of interaction pages matching with the multi-media data found by the data, that is, each type of content included in the multi-media data may correspond to one type of interaction page. Moreover, even the multi-media data includes one type of content, the server may also search for multiple types of interaction pages corresponding to the content. For example, if the multi-media data merely includes the image data of a certain public person, the server can find a shopping page matching with the image data, and may also find a chat page matching with the image data, and the like. The type of the interaction page matching with the multi-media data found by the server is not limited in this embodiment.

406: The terminal receives at least one type of interaction page matching with the multi-media data.

If the at least one type of interaction page sent by the server in step 405 is at least one interaction page matching with the multi-media data, the interaction page received by the terminal in this step is the at least on interaction page matching with the multi-media data. If the at least one type of interaction page sent in step 405 is at least one interaction page matching with the multi-media data and the time information, the interaction page received by the terminal in this step is the at least on interaction page matching with the multi-media data and the time information.

407: The terminal displays the at least one type of interaction page, and implements a corresponding type of interaction operation according to each type of interaction page.

The specific method of displaying each type of interaction function is not limited in this embodiment. For example, each type of received interaction page is displayed in a form of an H5 page.

The specific method of implementing a corresponding type of interaction operation according to each type of interaction page is not limited in this embodiment either, and according to different types of the acquired interaction pages, the manner of the terminal implements a corresponding type of interaction operation according to the interaction page includes, but not limited to, any one of the following nine types.

In the first manner of implementing an interaction operation: if one of the interaction pages is a voting page including at least two voting options, a voting result of voting options is acquired according to the voting page, and the voting result is sent.

Figure 6:
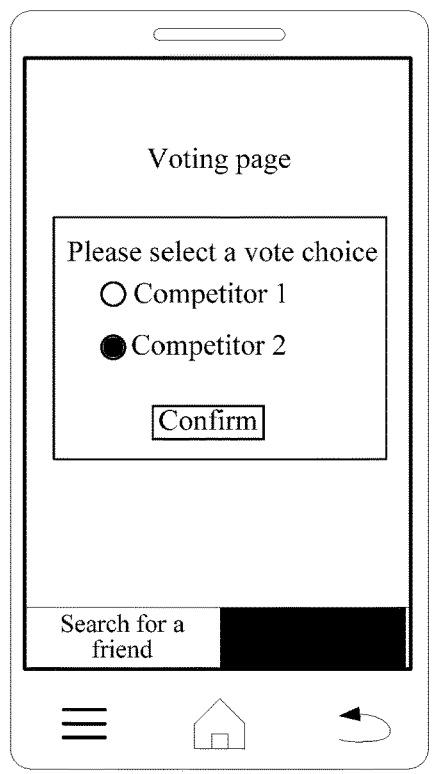
FIGS. 6a-6d are schematic diagrams of several interaction pages of a first mobile phone according to an exemplary embodiment.
Figure 6:
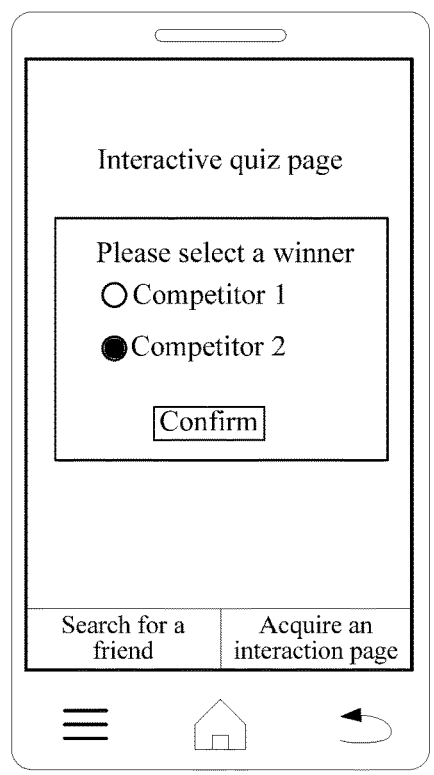
Figure 6:
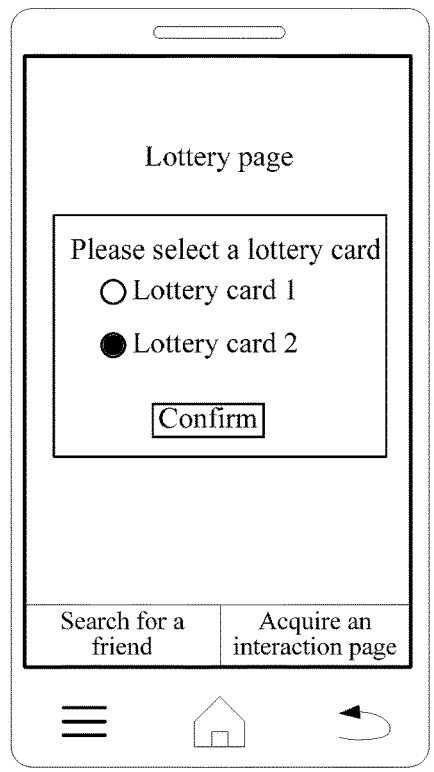
Figure 6:
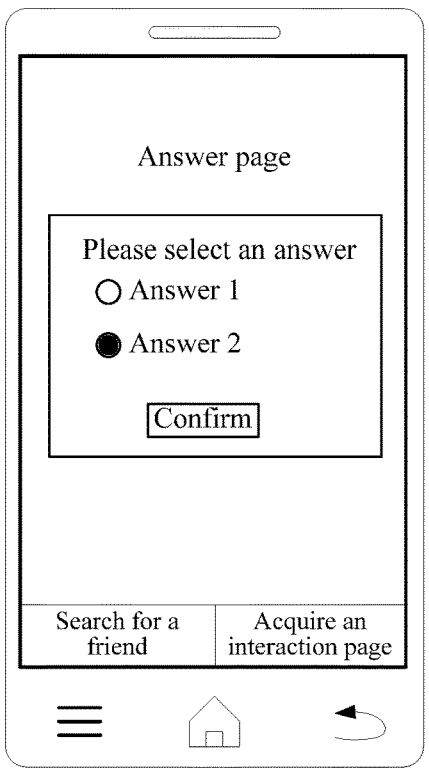

By using the interaction page being a voting page shown in FIG. 6(a) as an example, one or more voting options selected by a user on the voting page according to personal opinions, a voting result of the selected voting options is acquired, the voting result is sent to a background server, and the background server performs statistics and analysis on the voting result, and records the voting result.

In addition, if the background server returns feedback information of the voting result after performing statistics and analysis on the voting result, optionally, the terminal may further receive and display the feedback information of the voting result.

The specific content of the feedback information of the voting result is not limited in this embodiment. For example, the content of the feedback information of the voting result is a current total voting result. The specific method of displaying the feedback information of the voting result is not limited in this embodiment either. For example, the feedback information of the current voting result is displayed in a form of an H5 page.

In the second manner of implementing an interaction operation: if one of the interaction pages is an interactive quiz page including at least two interactive quiz options, an interactive quiz result of interactive quiz options is acquired according to the interactive quiz page, and the interactive quiz result is sent.

By using the interaction page being an interactive quiz page shown in FIG. 6(b) as an example, one or more interactive quiz options selected by a user on the interactive quiz page according to personal prediction on results, an interactive quiz result of the selected interactive quiz options is acquired, the interactive quiz result is sent to a background server, and the background server performs statistics and analysis on the interactive quiz result, and records the interactive quiz result.

In addition, if the background server returns feedback information of the interactive quiz result after performing statistics and analysis on the interactive quiz result, optionally, the terminal may further receive and display the feedback information of the interactive quiz result.

The specific content of the feedback information of the interactive quiz result is not limited in this embodiment. For example, the content of the feedback information of the interactive quiz result is an interactive quiz result distribution of all current users. Or, the content of the feedback information of the interactive quiz result is whether the interactive quiz is correct. The specific method of displaying the feedback information of the interactive quiz result is not limited in this embodiment either. For example, the feedback information of the current interactive quiz result is displayed in a form of an H5 page.

Moreover, if the content of the feedback information of the interactive quiz result is whether the interactive quiz is correct, in addition to displaying the feedback information about whether the interactive quiz is correct, a reward page when the interactive quiz is correct may also be displayed.

In the third manner of implementing an interaction operation, if one of the interaction pages is a lottery page including lottery information, a lottery result corresponding to the lottery information may be acquired according to the lottery page, and the lottery result is displayed.

The manner of acquiring the lottery result corresponding to the lottery information according to the lottery page is not specifically limited in this embodiment, including, but not limited to, acquiring a random lottery result from a background server according to the lottery information, and the like. By using the interaction page being the lottery page shown in FIG. 6(c) as an example, selected lottery information on the lottery page is acquired, a lottery result corresponding to the selected lottery information is acquired, and the lottery result is displayed.

In addition, the specific displaying method of displaying the lottery result is not limited in this embodiment. For example the lottery result is displayed immediately after the lottery result corresponding to the selected lottery information is acquired. For example the lottery result is displayed immediately after the lottery result corresponding to the selected lottery information is acquired.

In the fourth manner of implementing an interaction operation, if one of the interaction pages is an answer page including an answer option or a text input box, an answer result of the answer option or an answer result input in the text input box is acquired according to the answer page, and the answer result of the answer option or the answer result input in the text input box is sent.

By using the interaction page being the answer page shown in FIG. 6(d) as an example, one or more answer options selected on the answer page by a user according to a personal answer on the question are acquired, the selected answer options are used as the answer result, and the answer result is sent.

Figure 7:
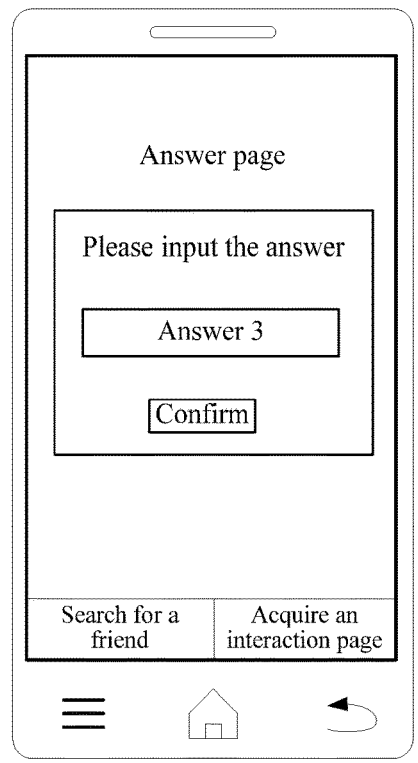
FIGS. 7a-7d are schematic diagrams of several interaction pages of a second mobile phone according to an exemplary embodiment.
Figure 7:
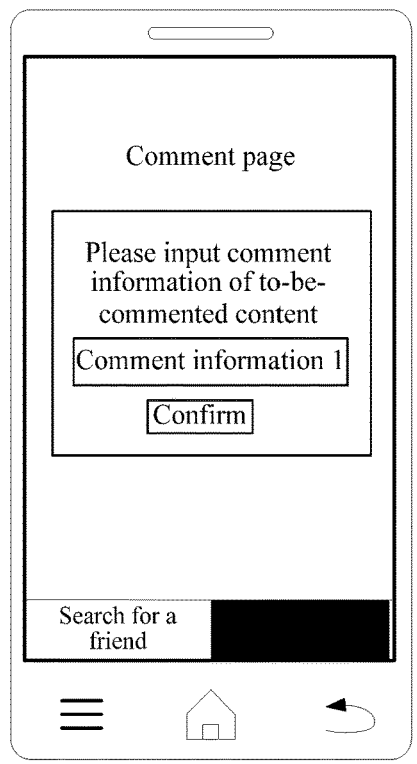
Figure 7:
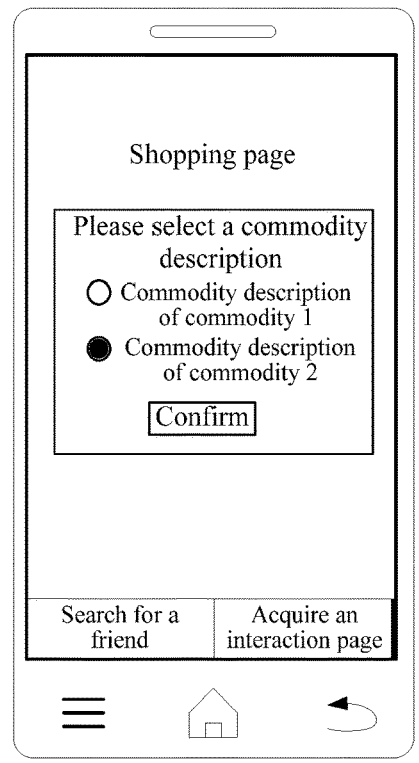
Figure 7:
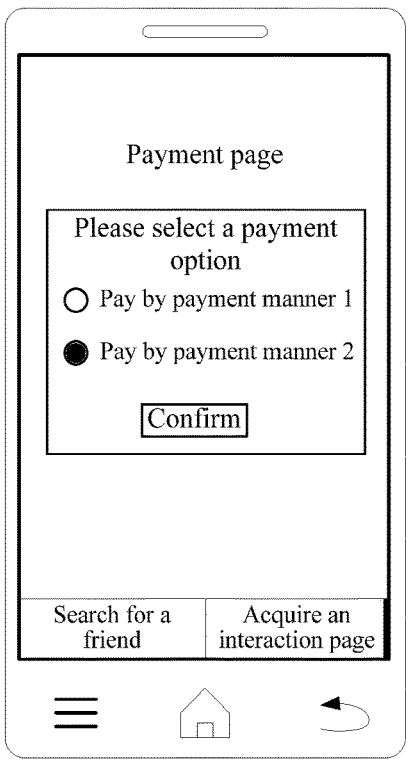

By using the interaction page being the answer page shown in FIG. 7(a) as an example, the answer result input in the text input box on the answer page by a user according to a personal answer on the question is acquired, the answer result is sent to a background server, such that the background server performs statistics and analysis on the answer result, and records the answer result.

In addition, if the background server returns feedback information of the answer result after performing statistics and analysis on the answer result, optionally, the terminal may further receive and display the feedback information of the answer result.

The specific content of the feedback information of the answer result is not limited in this embodiment. For example, the content of the feedback information of the answer result is whether the answer result is correct. If the content of the feedback information of the answer result is whether the answer result is correct, in addition to displaying the feedback information about whether the answer result is correct, a first reward page when the answer result is correct may further be displayed, or a punishment page when the answer page is wrong may further be displayed, or a second reward page when the answer result is wrong may further be displayed.

In the fifth manner of implementing an interaction operation, if one of the interaction pages is a comment page including to-be-commented content, comment information of the to-be-commented content is acquired according to the comment page, and the comment information is sent.

By using the interaction page being the comment page shown in FIG. 7(b) as an example, comment information of the to-be-commented content input by a user on the comment page according to a personal understanding on the to-be-commented content, and the comment information is sent.

Optionally, after the comment information is acquired, the comment information may further be displayed. The specific displaying method of displaying the comment information is not limited in this embodiment. For example, the comment information is displayed immediately after the comment information is acquired. Or, after the comment information is acquired, the comment information is checked, and the comment information is displayed after passing the check.

In the sixth manner of implementing an interaction operation, if one of the interaction pages is a shopping page including commodity description information, detailed information corresponding to the commodity description information is acquired according to the shopping page, and the detailed information is displayed. The commodity description information includes, but is not limited to, a commodity picture, a commodity name, a price, a popularity index, and the like.

By using the interaction page being the shopping page shown in FIG. 7(c) as an example, the commodity description information selected by a user on the shopping page is acquired, detailed information corresponding to the selected commodity description information is selected, and the detailed information is displayed.

The specific methods of acquiring the detailed information corresponding to the selected commodity description information and displaying the detailed information are not limited in this embodiment. For example, a background server is requested for the detailed information corresponding to the selected commodity description information, and the detailed information is displayed in a form of an H5 page.

In the seventh manner of implementing an interaction operation, if one of the interaction pages is a payment page including a payment option, payment information corresponding to the payment option is acquired according to the payment page, and as payment related operation is performed according to the payment information.

By using the interaction page being the payment page shown in FIG. 7(d), payment option selected by a user on the payment page is acquired, payment information corresponding to the selected payment option is acquired, and a payment related operation is performed according to the payment information. The manner of performing the payment related operation according to the payment information includes, but is not limited to, sending the payment information to a corresponding background server, performing, by the background server, verification on the payment information, and after the verification is passed, completing the payment operation, and the like. The payment related operation performed herein may refer to processes implementing payment in various applications involving payment operations, which is not specifically limited in this embodiment.

In the eighth manner of implementing an interaction operation, if one of the interaction pages is a chat page, chat information is acquired according to the chat page, and the chat information is sent.

Figure 8:
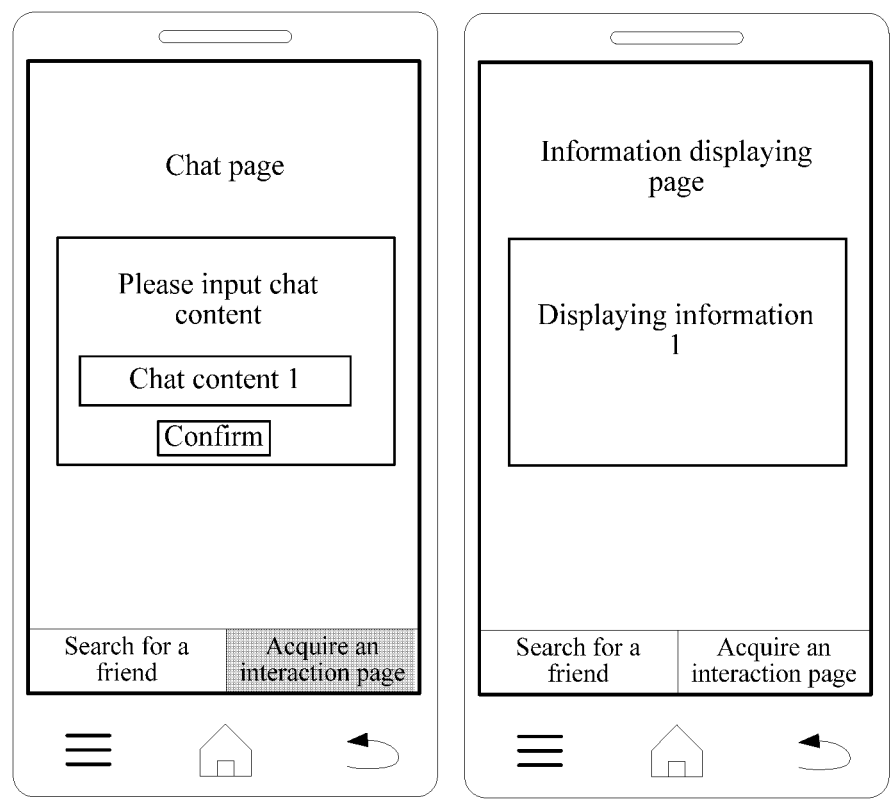
FIGS. 8a-8b are schematic diagrams of several interaction pages of a third mobile phone according to an exemplary embodiment.

By using the interaction page being the chat page shown in FIG. 8(a) as an example, chat information selected or input by as user on the chat page is acquired, and the chat information is sent.

The specific method of sending the chat information is not limited in this embodiment. For example, a chat information receiving identification input by the user is acquired, or the user acquires a chat information receiving identification from a chat information receiving identification list, and sends the chat information to the chat information receiving identification.

Optionally, after acquiring the chat information receiving identification input by the user, it may further be determined whether the input chat information receiving identification is located in the chat information receiving identification, if the input chat information receiving identification is not located in the chat information receiving identification list, information of the chat information receiving identification is displayed, so as to add the input chat information receiving identification to the chat information receiving identification list.

In the ninth manner of implementing an interaction operation, if one of the interaction pages is an information displaying page, a picture, a text, a video, or image-text information is displayed according to the information displaying page.

By using the interaction page being the information displaying page shown in FIG. 8(b) as an example, a text displayed on the information displaying page is displayed.

It should he noted that, when the terminal implements a corresponding type of interaction operation according to each type of interaction page, the terminal may implement a corresponding type of interaction operation in a corresponding to manner in the following first to ninth manners of implementing an interaction operation according to a type of the received interaction page. For example, if the interaction page received by the terminal includes an information displaying page and a chat page, the terminal implements corresponding types of interaction operations according, to the eighth and ninth manners of implementing an interaction operation.

Figure 9:
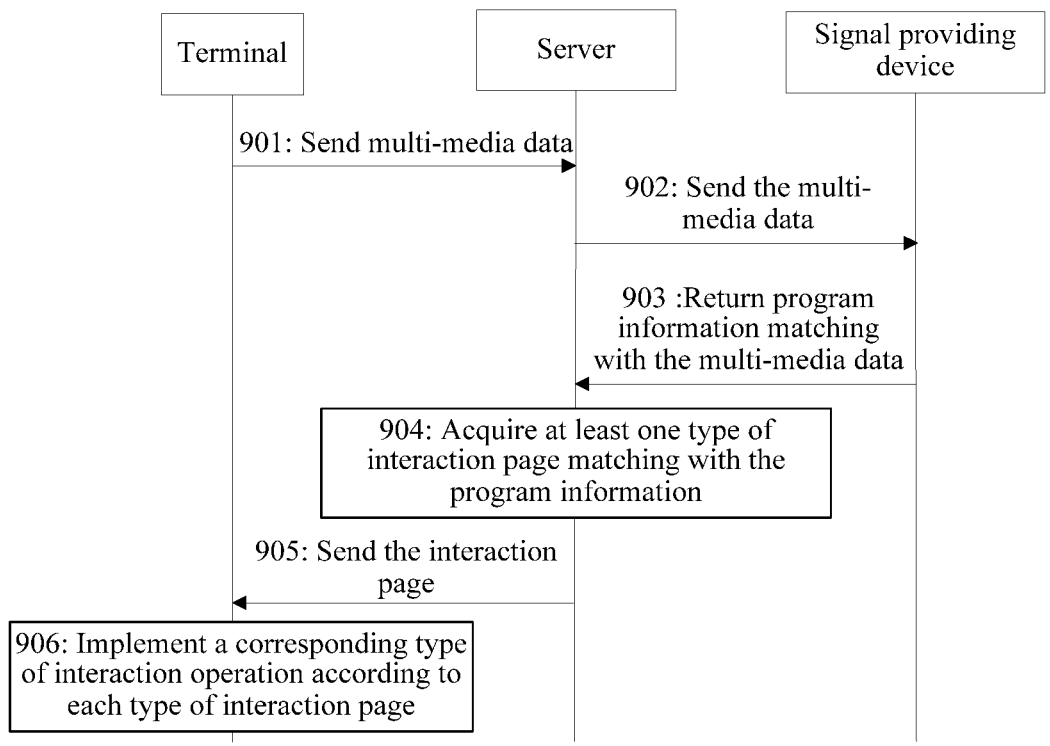
FIG. 9 is a schematic diagram of an implementation process of a video-based interaction method according to an exemplary embodiment.

In addition, during specific implementation of the method provided in this embodiment, according to an implementation process shown in FIG. 9, an interaction instruction is acquired and multi-media data related to a video is acquired according to the interaction instruction, and step 901 is implemented to send the multi-media data. A server acquires the multi-media data and implements step 902 to send the multi-media data to a signal providing device. The signal providing device implements step 903 to receive the multi-media data, and returns program information matching with the multi-media data. The server implements step 904 after acquiring the program information, acquires an interaction page matching with the program information according to a pre-stored correspondence between program information and an interaction page, and implements step 905 to send the interaction page. A terminal receives and displays the interaction page, and as shown in step 906, implements a corresponding type of interaction operation according to each type of interaction page.

In the method provided in this embodiment, by acquiring and sending multi-media data related to a video, receiving and displaying each type of interaction page matching with the multi-media data, and implementing a corresponding type of interaction operation according to each type of interaction page, an interaction failure caused by incorrectly input interaction instruction may be avoided, and at the same time, the situation of increasing the interaction complexity due to acquiring an interaction identification by using an acquisition manner corresponding to the interaction identification is also avoided. Not only the success rate of interaction is improved, the interaction complexity is reduced, but also the processing manner of interaction is more flexible. Moreover, content included in the multi-media data is abundant, and there are types of interaction pages matching with the multi-media data: therefore, interaction operations implemented according to the interaction pages are diversified, thereby enriching the interaction experience.

Figure 10:
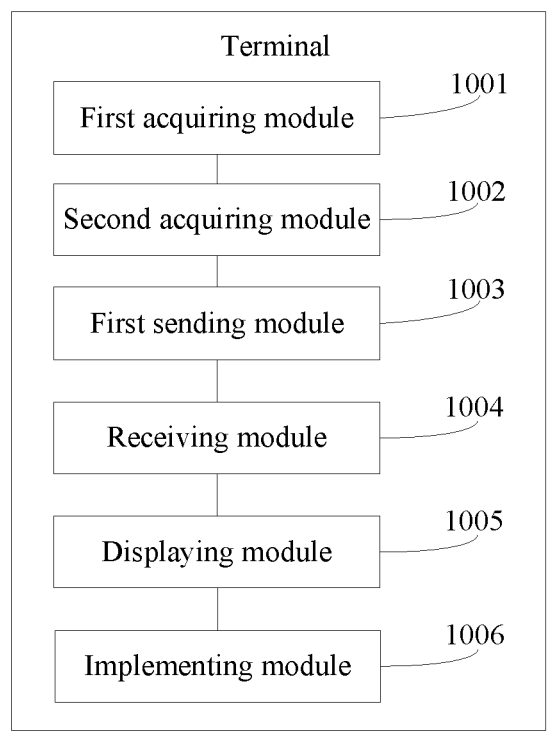
FIG. 10 is a schematic structural diagram of a terminal according to an exemplary embodiment.

FIG. 10 shows a terminal according to an exemplary embodiment, and the terminal is configured to implement the function implemented by the terminal in the video-based interaction method shown in any exemplary embodiment in FIG. 4 to FIG. 9. Referring to FIG. 10, the terminal includes:

a first acquiring module 1001, configured to acquire an interaction instruction;

a second acquiring module 1002, configured to acquire multi-media data related to a video according to the interaction instruction acquired by the first acquiring module 1001;

a first sending module 1003, configured to send the multi-media data acquired by the second acquiring module 1002;

a receiving module 1004, configured to receive at least one type of interaction page matching with the multi-media data sent by the first sending module 1003, different interaction pages corresponding to different types of interaction operations;

a displaying module 1005, configured to display the at least one type of interaction page received by the receiving module 1004; and an implementing module 1006, configured to implement a corresponding type of interaction operation according to each type of interaction page received by the receiving module 1004.

Optionally, the second acquiring module 1002 is configured to acquire image data in the video according to the interaction instruction, and use the image data as the multi-media data related to the video.

Optionally, the second acquiring module 1002 is configured to acquire audio data in the video according to the interaction instruction, and use the audio data as the multi-media data related to the video.

Optionally, the second acquiring module 1002 is configured to acquire audio data in the video according to the interaction instruction, generate an audio fingerprint corresponding to the audio data, and use the audio fingerprint as the multi-media data related to the video.

Figure 11:
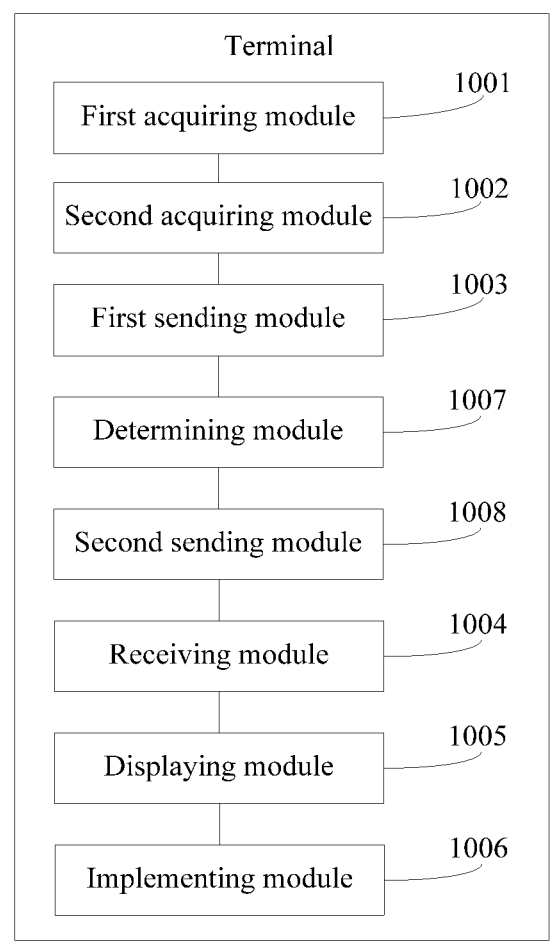
FIG. 11 is a schematic structural diagram of another terminal according to an exemplary embodiment.

Referring to FIG. 11, the terminal further includes:

a determining module 1007, configured to determine time information of the interaction instruction; and a second sending module 1008, configured to send the time information determined by the determining module 1007, where the receiving module 1004 is configured to receive at least one type of interaction page matching with the multi-media data and the time information.

Optionally, one type of interaction page is a voting page including at least two voting options; and the implementing module 1006 is configured to acquire a voting result of the voting options according to the voting page, and send the voting result.

Optionally, one type of interaction page is an interactive quiz page including at least two interactive quiz options; and the implementing module 1006 is configured to acquire an interactive quiz result of the interactive quiz options according to the interactive quiz page, and send the interactive quiz result.

Optionally, one type of interaction page is a lottery page including lottery information; and the implementing module 1006 is configured to acquire a lottery result corresponding to the lottery information according to the lottery page, and display the lottery result.

Optionally, one type of interaction page is an answer page including an answer option or a text input box; and the implementing module 1006 is configured to acquire an answer result of the answer option or an answer result input in the text input box according to the answer page, and send the answer result of the answer option or the answer result input in the text input box.

Optionally, one type of interaction page is a comment page including to-be-commented content; and the implementing module 1006 is configured to acquire comment information of the to-be-commented content according to the comment page, and send the comment information.

Optionally, one type of interaction page is a shopping page including commodity description information; and the implementing module 1006 is configured to acquire detailed information corresponding to the commodity description information according to the shopping page, and display the detailed information.

Optionally, one type of interaction page is a payment page including a payment option; and the implementing module 1006 is configured to acquire payment information corresponding to the payment option according to the payment page, and perform a payment related operation according to the payment information.

Optionally, one type of interaction page is a chat page; and the implementing module 1006 is configured to acquire chat information according to the chat page, and send the chat information.

Optionally, one type of interaction page is an information displaying page; and the implementing module 1006 is configured to display as picture, a text, a video, or image-text information according to the information displaying page.

In the terminal provided in this embodiment, by acquiring and sending multi-media data related to a video, receiving and displaying each type of interaction page matching with the multi-media data, and implementing a corresponding type of interaction operation according to each type of interaction page, an interaction failure caused by incorrectly input interaction instruction may be avoided, and at the same time, the situation of increasing the interaction complexity due to acquiring an interaction identification by using an acquisition manner corresponding to the interaction identification is also avoided. Not only the success rate of interaction is improved, the interaction complexity is reduced, but also the processing manner of interaction is more flexible. Moreover, content included in the multi-media data is abundant, and there are types of interaction pages matching with the multi-media data therefore, interaction operations implemented according to the interaction pages are diversified, thereby enriching the interaction experience.

Figure 12:
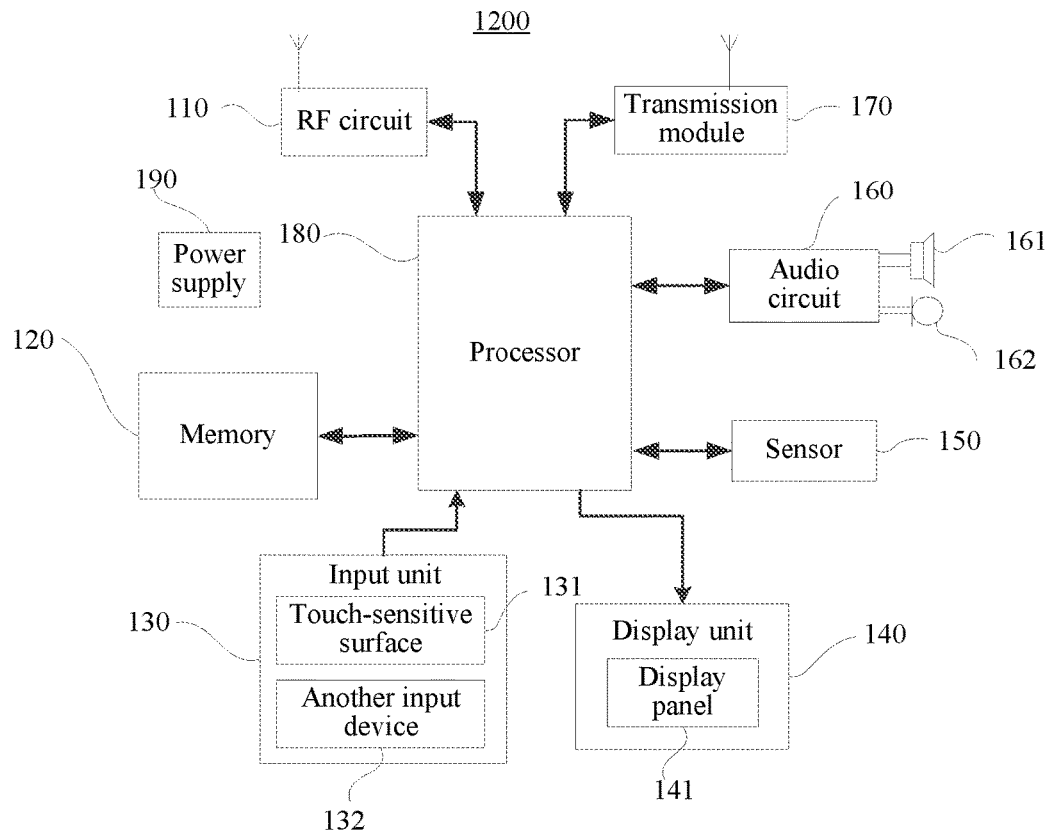
FIG. 12 is a schematic structural diagram of a terminal according to an exemplary embodiment.

FIG. 12 shows a terminal according to an exemplary embodiment. FIG. 12 is a schematic structural diagram of a terminal having a touch-sensitive surface involved in the exemplary embodiment of the present disclosure, and the terminal may be configured to implement the function implemented by the terminal in the video-based interaction method shown in any exemplary embodiment in FIG. 4 to FIG. 9. Specifically:

The terminal 1200 may include a Radio Frequency (RF) circuit 110, a memory 120 including one or more computer readable storage media, an input unit 130, a displaying unit 140 a sensor 150, an audio circuit 160, a transmission module 170, a processor 180 including one or more processing cores, a power supply 1100, and other components. A person skilled in the art should understand that the structure of the terminal shown in FIG. 12 does not constitute a limitation to the terminal, and the terminal may include more components or fewer components than those shown in the figure, or some components may be combined, or a different component deployment may be used, where:

The RF circuit 110 may be configured to receive and send signals during an information receiving and sending process or a call process, and particularly, receive downlink information from a base station, then delivers the downlink information to the one or more processors 180 for processing; in addition, send related uplink data to the base station. Generally, the RF circuit 110 includes, but is not limited to, an antenna, at least one amplifier, a tuner, one or more oscillators, a subscriber identity module (SIM) card, a transceiver, a coupler, a Low Noise Amplifier (LNA), a duplexer, and the like. In addition, the RF circuit 110 may further communicate with a network and another device by wireless communication. The wireless communication may use any communications standard or protocol, which includes, but is not limited to: Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 120 may be configured to store a software program and module, for example, a software program and module corresponding to the terminal shown in the above exemplary embodiment, and the processor 180 runs the software program and module stored in the memory 120 to implement various functional applications and data processing, such as implementing video-based interaction. The memory 120 may mainly include a program storage area and a data storage area. The program storage area may store an operating system, an application program required by at least one function (such as a sound playback function and an image display function), and the like. The data storage area may store data (such as audio data and an address book) created according to the use of the terminal 1200, and the like. Moreover, the memory 120 may include a high speed random access memory, and may also include a non-volatile memory, for example, at least one magnetic disk storage device, a flash memory, or another non-volatile solid-state storage device. Accordingly, the storage 120 may further include a memory controller, so that the processor 180 and the input unit 130 access the memory 120.

The input unit 130 may be configured to receive input digit or character information, so as to generate a keyboard, mouse, joystick, optical or track ball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (for example, an operation of a user on the touch-sensitive surface 131 or near the touch-sensitive surface 131 by using any suitable object or accessory, such as a finger or a stylus), and drive a corresponding connection apparatus according to a preset program. Optionally, the touch-sensitive surface 131 may include two parts, namely, a touch detection apparatus and a touch controller. The touch detection apparatus detects a touch position of the user, detects a signal generated by the touch operation, and transfers the signal to the touch controller. The touch controller receives the touch signal from the touch detection apparatus, converts the touch signal into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may include the another input device 132. Specifically, the another input device 132 may include, but is not limited to, one or more of a physical keyboard, a functional key (such as a volume control key and a switch key), a track ball, a mouse, and a joystick.

The display unit 140 may be configured to display information input by the user or information provided for the user, and various graphic user interfaces of the terminal 1200, and the graphic user interfaces may be formed by using a graph, a text, an icon, a video, and any combination thereof. The display unit 140 may include a display panel 141, and optionally, the display panel 141 may be configured by using a Liquid Crystal Display (LCD), an Organic Light-Emitting Diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 12, the touch-sensitive surface 131 and the display panel 141 are used as two separate parts to implement input and output functions, in some embodiments, the touch-sensitive surface 131 and the display panel 141 may be integrated to implement the input and output functions.

The terminal 1200 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1200 is moved to the ear. As one type of the motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and a magnetometer attitude collaboration), a function related to vibration recognition (such as a pedometer and a knock), and the like. Other sensors, such as a gyroscope, a barometer, a hygrometer, a thermometer, and an infrared sensor, which may be configured in the terminal 1200, are not further described herein.

The audio circuit 160, a loudspeaker 161, and a microphone 162 may provide audio interfaces between the user and the terminal 1200. The audio circuit 160 may convert received audio data into an electric signal and transmit the electric signal to the loudspeaker 161. The loudspeaker 161 converts the electric signal to a sound signal for output. On the other hand, the microphone 162 converts a collected sound signal into an electric signal. The audio circuit 160 receives the electric signal and converts the electric signal to audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1200.

The terminal 1200 may help, by using the transmission module 170, the user to receive and send emails, browse a webpage, access stream media, and so on, which provides wireless or wired broadband Internet access for the user. Although FIG. 12 shows the transmission module 170, it may be understood that the transmission module is not a necessary component of the terminal 1200, and when required, the transmission module may be omitted as long as the scope of the essence of the present disclosure is not changed.

The processor 180 is the control center of the terminal 1200, and is connected to various parts of the mobile phone by using various interfaces and lines. By running or executing the software program and/or module stored in the memory 120, and invoking data stored in the memory 120, the processor 180 performs various functions and processing data of the terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem processor mainly processes wireless communication. It may be understood that the foregoing modem may also not be integrated into the processor 180.

The terminal 1200 may further include a power supply 1100 (for example, a battery) for supplying power to the components. Preferably, the power supply may be logically connected to the processor 180 by using a power management system, thereby implementing functions such as charging, discharging, and power consumption management by using the power management system. The power supply 1100 may further include any component, such as one or more direct current or alternate current power supplies, a re-charging system, a power supply fault detection circuit, a power supply converter or an inverter, and a power supply state indicator.

Although not shown in the figure, the terminal 1200 may further include a camera, a Bluetooth module, and the like, which are not further described herein. Specifically, in this embodiment, the display unit of the terminal is a touch screen display, and the terminal further includes a memory and one or more programs. The one or more programs are stored in the memory and are configured to be implemented by one or more processors. The one or more programs contain instructions used for implementing the following operations:

acquiring an interaction instruction;

acquiring multi-media data related to a video according to the interaction instruction;

sending the multi-media data;

receiving at least one type of interaction page matching with the multi-media data, different interaction pages corresponding to different types of interaction operations; and displaying the at least one type of interaction page, and implementing a corresponding type of interaction operation according to each type of interaction page.

Assuming that the above description is the first possible implementation manner, in the second possible implementation manner provided on the basis of the first possible implementation manner, the memory of the terminal further includes an instruction used for implementing the following operation:

acquiring image data in the video according to the interaction instruction, and using the image data as the multi-media data related to the video.

In the third possible implementation manner provided on the basis of the first possible implementation manner, the memory of the terminal further includes an instruction used for implementing the following operation:

acquiring audio data in the video according to the interaction instruction, and using the audio data as the multi-media data related to the video.

In the fourth possible implementation manner provided on the basis of the first possible implementation manner, the memory of the terminal further includes an instruction used for implementing the following operation:

acquiring audio data in the video according to the interaction instruction, generating an audio fingerprint corresponding to the audio data, and using the audio fingerprint as the multi-media data related to the video.

In the fifth possible implementation manner provided on the basis of the first, second, third and fourth possible implementation manners, the memory of the terminal further includes instructions used for implementing the following operation:

determining time information of the interaction instruction, and sending the time information; and the receiving at least one type of interaction page matching with the multi-media data includes:

receiving at least one type of interaction page matching with the multi-media data and the time information.

In the sixth possible implementation manner provided on the basis of the first, second, third, fourth and fifth possible implementation manners, the memory of the terminal further includes an instruction used for implementing the following operation: when one of the interaction pages is a voting page including at least two voting options, the implementing a corresponding type of interaction operation according to each type of interaction page includes:

acquiring a voting result of the voting options according to the voting page, and sending the voting result.

In the seventh possible implementation manner provided on the basis of the first, second, third, fourth and fifth possible implementation manners, the memory of the terminal further includes an instruction used for implementing the following operation: when one of the interaction pages is an interactive quiz page including at least two interactive quiz options, the implementing a corresponding type of interaction operation according to each type of interaction page includes: acquiring an interactive quiz result of the interactive quiz options according to the interactive quiz page, and sending the interactive quiz result.

In the eighth possible implementation manner provided on the basis of the first, second, third, fourth and fifth possible implementation manners, the memory of the terminal further includes an instruction used for implementing the following operation: when one of the interaction pages is a lottery page including lottery information, the implementing a corresponding type of interaction operation according to each type of interaction page includes: acquiring a lottery result corresponding to the lottery information according to the lottery page, and displaying the lottery result.

In the ninth possible implementation manner provided on the basis of the first, second, third, fourth and fifth possible implementation manners, the memory of the terminal further includes an instruction used for implementing the following operation: when one of the interaction pages is an answer page including an answer option or a text input box, the implementing a corresponding type of interaction operation according to each type of interaction page includes: acquiring an answer result of the answer option or an answer result input in the text input box according to the answer page, and sending the answer result of the answer option or the answer result input in the test input box.

In the tenth possible implementation manner provided on the basis of the first, second, third, fourth and fifth possible implementation manners, the memory of the terminal further includes an instruction used for implementing the following operation: when one of the interaction pages is a comment page including to-be-commented content, the implementing a corresponding type of interaction operation according to each type of interaction page includes: acquiring comment information of the to-be-commented content according to the comment page, and sending the comment information.

In the eleventh possible implementation manner provided on the basis of the first, second, third, fourth and fifth possible implementation manners, the memory of the terminal further includes an instruction used for implementing the following operation: when one of the interaction pages is a shopping page including commodity description information, the implementing a corresponding type of interaction operation according to each type of interaction page includes: acquiring detailed information corresponding to the commodity description information according to the shopping page, and displaying the detailed information.

In the twelfth possible implementation manner provided on the basis of the first, second, third, fourth and fifth possible implementation manners, the memory of the terminal further includes an instruction used for implementing the following operation: when one of the interaction pages is a payment page include a payment option, the implementing a corresponding type of interaction operation according to each type of interaction page includes:

acquiring payment information corresponding to the payment option according to the payment page, and performing a payment related operation according to the payment information.

In the thirteenth possible implementation manner provided on the basis of the first, second, third, fourth and fifth possible implementation manners, the memory of the terminal further includes an instruction used for implementing the following operation: when one of the interaction pages is a chat page, the implementing a corresponding type of interaction operation according to each type of interaction page includes: acquiring chat information according to the chat page, and sending the chat information.

In the fourteenth possible implementation manner provided on the basis of the first, second, third, fourth and fifth possible implementation manners, the memory of the terminal further includes an instruction used for implementing the following operation: when one of the interaction pages is an information displaying page, the implementing a corresponding type of interaction operation according to each type of interaction page includes: displaying a pictured, a text, a video or image-text information according to the information displaying page.

In view of the above, in the terminal provided in this embodiment, by acquiring and sending multi-media data related to a video, receiving and displaying each type of interaction page matching with the multi-media data, and implementing a corresponding type of interaction operation according to each type of interaction page, an interaction failure caused by incorrectly input interaction instruction may be avoided, and at the same time, the situation of increasing the interaction complexity due to acquiring an interaction identification by using an acquisition manner corresponding to the interaction identification is also avoided. Not only the success rate of interaction is improved, the interaction complexity is reduced, but also the processing manner of interaction is more flexible. Moreover, content included in the multi-media data is abundant, and there are types of interaction pages matching with the multi-media data; therefore, interaction operations implemented according to the interaction pages are diversified, thereby enriching the interaction experience.

This exemplary implementation shows a computer readable storage medium, and the computer readable storage medium may be the computer readable storage medium included in the memory in the exemplary embodiment shown in FIG. 12, and may also be a computer readable storage medium that exists separately and is not assembled in the terminal. The computer readable storage medium stores one or more programs, the one or more programs are implemented by one or more processors to implement acquisition of interaction information, and the method includes:

acquiring an interaction instruction;
acquiring multi-media data related to a video according to the interaction instruction;
sending the multi-media data;
receiving at least one type of interaction page matching with the multi-media data, different interaction pages corresponding to different types of interaction operations; and
displaying the at least one type of interaction page, and implementing a corresponding type of interaction operation according to each type of interaction page.

Various possible implementation manners may refer to the descriptions of the embodiments of the terminal in the foregoing, and are not described in detail herein.

In the computer readable storage medium provided in the embodiment of the present disclosure, by acquiring and sending multi-media data related to a video, receiving and displaying each type of interaction page matching with the multi-media data, and implementing a corresponding type of interaction operation according to each type of interaction page, an interaction failure caused by incorrectly input interaction instruction may be avoided, and at the same time, the situation of increasing the interaction complexity due to acquiring an interaction identification by using an acquisition manner corresponding to the interaction identification is also avoided. Not only the success rate of interaction is improved, the interaction complexity is reduced, but also the processing manner of interaction is more flexible. Moreover, content included in the multi-media data is abundant, and there are types of interaction pages matching with the multi-media data; therefore, interaction operations implemented according to the interaction pages are diversified, thereby enriching the interaction experience.

This exemplary implementation shows a graphic user interface, the graphic user interface is applied to the terminal in the exemplary embodiment shown in FIG. 10 or FIG. 11, and the terminal includes a touch screen display, a memory, and one or more processors configured to execute one or more programs; and the graphic user interface includes:

acquiring an interaction instruction;
acquiring multi-media data related to a video according to the interaction instruction;
sending the multi-media data;
receiving at least one type of interaction page matching with the multi-media data; and
displaying the at least one type of interaction page, and implementing a corresponding type of interaction operation according to each type of interaction page.

In the graphic user interface provided in the embodiment of the present disclosure, by acquiring and sending multi-media data related to a video, receiving and displaying each type of interaction page matching with the multi-media data, and implementing a corresponding type of interaction operation according to each type of interaction page, an interaction failure caused by incorrectly input interaction instruction may be avoided, and at the same time, the situation of increasing the interaction complexity due to acquiring an interaction identification by using an acquisition manner corresponding to the interaction identification is also avoided. Not only the success rate of interaction is improved, the interaction complexity is reduced, but also the processing manner of interaction is more flexible. Moreover, content included in the multi-media data is abundant, and there are types of interaction pages matching with the multi-media data; therefore, interaction operations implemented according to the interaction pages are diversified, thereby enriching the interaction experience.

Figure 13:
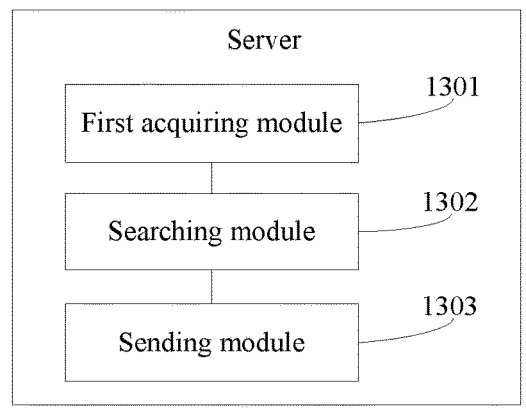
FIG. 13 is a schematic structural diagram of a server according to an exemplary embodiment.

FIG. 13 shows a server according to an exemplary embodiment, and the server is configured to implement the function implemented by the server in the video-based interaction method shown in any exemplary embodiment in FIG. 4 to FIG. 9. Referring to FIG. 13, the server includes:

a first acquiring module 1301, configured to acquire multi-media data, the multi-media data being related to a video;

a searching module 1302, configured to search for at least one type of interaction page matching with the multi-media data acquired by the first acquiring module 1301, different interaction pages corresponding to different types of interaction operations; and a sending module 1303, configured to send the at least one type of interaction page found by the searching module 1302.

Optionally, the multi-media data is image data related to a video; and the searching module 1302 is configured to search for at least one type of interaction page matching with the image data.

Optionally, the multi-media data is audio data related to a video; and the searching module 1302 is configured to generate an audio fingerprint according to the audio data, and search for at least one type of interaction page matching with the audio fingerprint.

Optionally, the multi-media data is an audio fingerprint related to a video; and the searching module 1302 is configured to search for at least one type of interaction page matching with the audio fingerprint.

Figure 14:
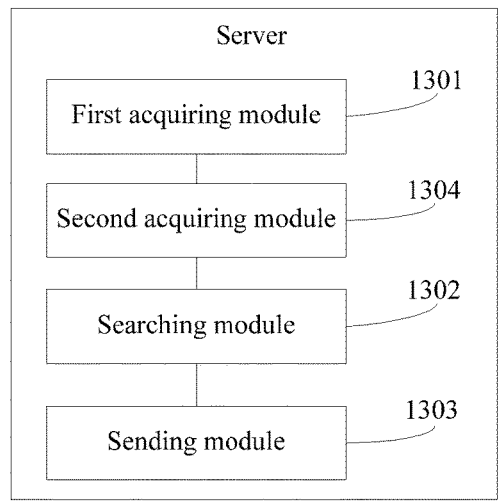
FIG. 14 is a schematic structural diagram of another server according to an exemplary embodiment.

Referring to FIG. 14, the server further includes:

a second acquiring module 1304, configured to acquire time information, where the searching module 1302 is configured to search for at least one type of interaction page matching with the multi-media data and the time information.

The interaction page found by the searching module 1302 is one type of page including a voting page including at least two voting options, an interactive quiz page including at least two interactive quiz options, a lottery page including lottery information, an answer page including an answer option or a text input box, a comment page including to-be-commented content, a shopping page including commodity description information, a payment page including as payment option, a chat page, and an information displaying page.

In the server provided in this embodiment, by acquiring multi-media data related to a video sent by a terminal, searching for and sending at least one type of interaction page matching with the multi-media data, so that the terminal implements a corresponding type of interaction operation according to each type of interaction page, an interaction failure caused by incorrectly input interaction instruction may be avoided, and at the same time, the situation of increasing the interaction complexity due to acquiring an interaction identification by using an acquisition manner corresponding to the interaction identification is also avoided. Not only the success rate of interaction is improved, the interaction complexity is reduced, but also the processing manner of interaction is more flexible. Moreover, content included in the multi-media data is abundant, and there are types of interaction pages matching with the multi-media data; therefore, interaction operations implemented according to the interaction pages are diversified, thereby enriching the interaction experience.

Figure 15:
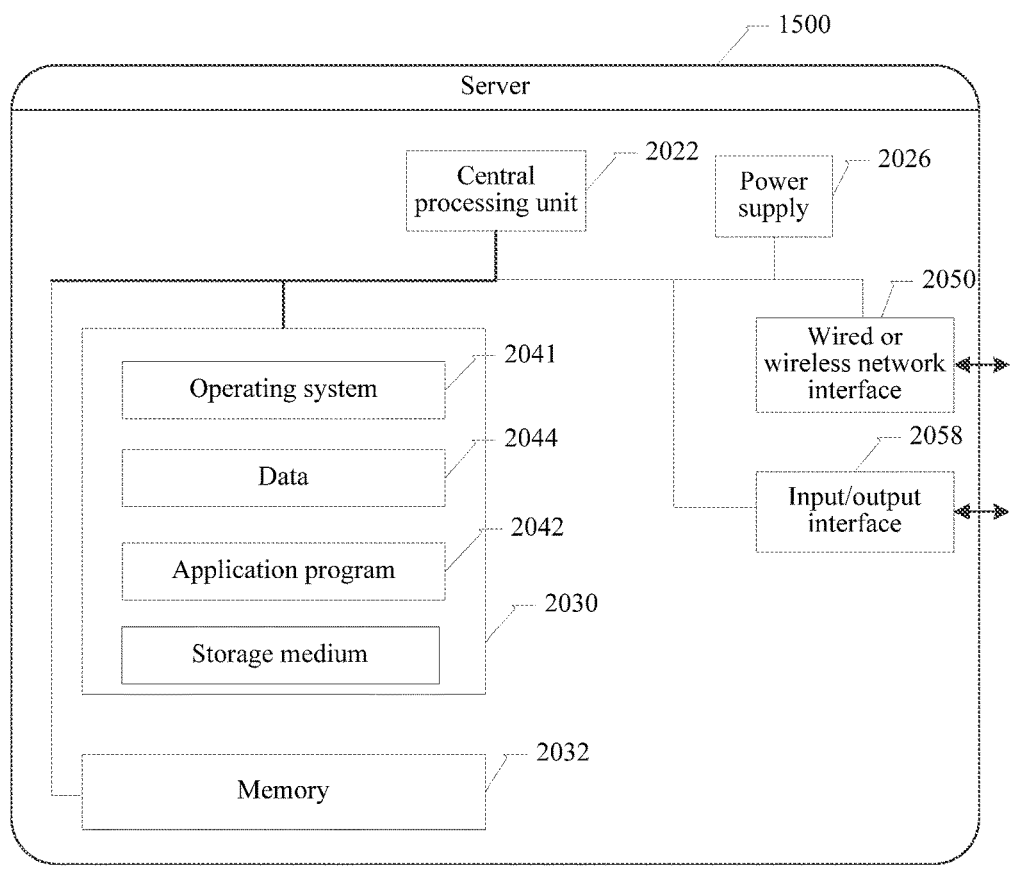
FIG. 15 is a schematic structural diagram of a server according to an exemplary embodiment.

FIG. 15 shows a server according to an exemplary embodiment, and the server is configured to implement the function implemented by the server in the video-based interaction method shown in any exemplary embodiment in FIG. 4 to FIG. 9. Specifically, referring to FIG. 15, the server 1500 may differ greatly due to different configurations or performances, may include one or more Central Processing Units (CPUs) 2022 (for example, one or more processors) and a memory 2032, one or more storage mediums 2030 (for example, one or more mass storage device) storing an application program 2042 or data 2044. The memory 2032 and the storage medium 2030 may be a short-time storage or a permanent storage. The program stored in the storage medium 2030 may include one or more modules (not labeled in the drawing).

The server 1500 may further include one or more power supplies 2026, one or more wired or wireless network interfaces 2050, one or more input/output interfaces 2058, and/or one or more operating systems 2041, such as Windows Server™, Mac OS X™, Unix™, Linux™, and FreeBSD™.

One or more programs are stored in the memory, and are configured to be executed by one or more processors, and the one or more programs contain instructions used for implementing the following operations:

acquiring multi-media data, the multi-media data being related to a video;

searching for at least one type of interaction page matching with the multi-media data, different interaction pages corresponding to different types of interaction operations; and sending the found at least one type of interaction page.

Assuming that the above description is the first possible implementation manner, in the second possible implementation manner provided on the basis of the first possible implementation manner, an instruction used for implementing the following operation is further contained:

searching for at least one type of interaction page matching with the image data.

In the third possible implementation manner provided on the basis of the first possible implementation manner, an instruction used for implementing the following operation is further contained:

generating an audio fingerprint according to the audio data, and searching for at least one type of interaction page matching with the audio fingerprint.

In the fourth possible implementation manner provided on the basis of the first possible implementation manner, an instruction used for implementing the following operation is further contained:

searching for at least one type of interaction page matching with the audio fingerprint.

In the fifth possible implementation manner provided on the basis of the first possible implementation manner, an instruction used for implementing the following operation is further contained:

searching for at least one type of interaction page matching with the multi-media data and the time information.

In the sixth possible implementation manner provided on the basis of the first, second, third, fourth and fifth possible implementation manners, an instruction used for implementing the following operation is further contained:

the interaction page is one type of page including a voting page including at least two voting options, an interactive quiz page including at least two interactive quiz options, a lottery page including lottery information, an answer page including answer options or text input boxes, a comment page including to-be-commented content, a shopping page including commodity description information, a payment page including a payment option, a chat page, and an information displaying page.

In the server provided in this embodiment, by acquiring multi-media data related to a video sent by a terminal, searching for and sending at least one type of interaction page matching with the multi-media data, so that the terminal implements a corresponding type of interaction operation according to each type of interaction page, an interaction failure caused by incorrectly input interaction instruction may be avoided, and at the same time, the situation of increasing the interaction complexity due to acquiring an interaction identification by using an acquisition manner corresponding to the interaction identification is also avoided. Not only the success rate of interaction is improved, the interaction complexity is reduced, but also the processing manner of interaction is more flexible. Moreover, content included in the multi-media data is abundant, and there are types of interaction pages matching with the multi-media data; therefore, interaction operations implemented according to the interaction pages are diversified, thereby enriching the interaction experience.

Figure 16:
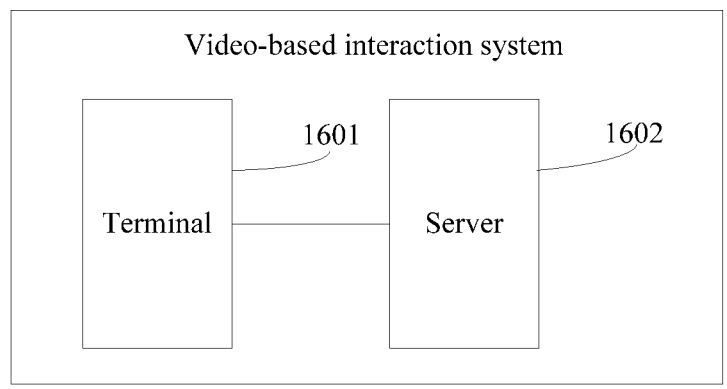
FIG. 16 is a schematic structural diagram of a video-based interaction system according to an exemplary embodiment.

FIG. 16 is a video-based interaction system according to an exemplary embodiment, and the system is configured to implement the video-based interaction method in any exemplary embodiment shown in FIG. 4 to FIG. 9. Referring to FIG. 16 the system includes: to terminal 1601 and a server 1602, where the terminal 1601 is the terminal in the exemplary embodiment shown in FIG. 10 or FIG. 11, and details may be obtained with reference to the exemplary embodiment of the terminal in the foregoing; and the server 1602 is the server in the exemplary embodiment shown in FIG. 13 or FIG. 14, and details may be obtained with reference to the exemplary embodiment of the server in the foregoing.

Figure 17:
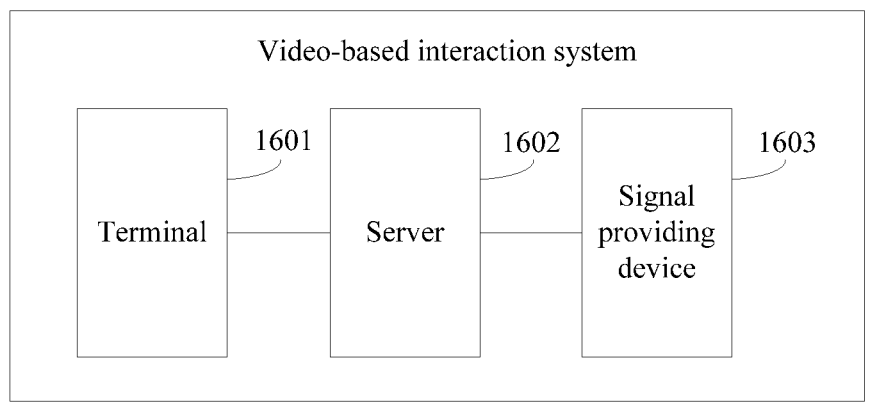
FIG. 17 is a schematic structural diagram of another video-based interaction system according to an exemplary embodiment.

Optionally, referring to FIG. 17, the system further includes: a signal providing device 1603.

The signal providing device 1603 is configured to receive the multi-media data sent by the server 1602, and return program information matching with the multi-media data.

In the system provided in this embodiment, by acquiring, by a server, multi-media data related to a video sent by a terminal, searching for and sending at least one type of interaction page matching with the multi-media data, so that the terminal implements a corresponding type of interaction operation according to each type of interaction page, an interaction failure caused by incorrectly input interaction instruction may be avoided, and at the same time, the situation of increasing the interaction complexity due to acquiring an interaction identification by using an acquisition manner corresponding to the interaction identification is also avoided. Not only the success rate of interaction is improved, the interaction complexity is reduced, but also the processing manner of interaction is more flexible. Moreover, content included in the multi-media data is abundant, and there are types of interaction pages matching with the multi-media data; therefore, interaction operations implemented according to the interaction pages are diversified, thereby enriching the interaction experience.

It should be noted that, the terminal and server provided in the above embodiments are illustrated exemplarily with divisions of various functional modules when implementing video-based interaction, and in an actual application, the functions may be distributed to different functional modules to be implemented as required, that is, internal structures of the terminal and the server are divided into different functional modules, so as to implement all or a part of functions described above. In addition, the terminal, the server and the system provided in the above embodiments as well as the video-based interaction method embodiment belong to the same conception, and details of the specific implementation processes may be obtained with reference to the method embodiments, and are not repeated herein.

The serial numbers of the embodiments of the present disclosure are merely used for description, and are not intended to represent priorities of the embodiments.

A person of ordinary skill in the art may understand that all or some of the steps of the foregoing embodiments may be implemented by hardware or by a program instructing relevant hardware. The program may be stored in a computer readable storage medium. The storage medium may be a read-only memory, a magnetic disk, an optical disc, or the like.

The above descriptions are embodiments of the present disclosure, and are not intended to limit the present disclosure. Any modification, equivalent replacement, improvement or the like made without departing from the spirit and principle of the present disclosure shall fall within the protection scope of the present disclosure.

What is claimed is:

1. A video-based interaction method performed by a mobile terminal comprising a processor and memory storing program codes, wherein the processor executes the stored program codes to perform operations comprising:

acquiring an interaction instruction from a user of the mobile terminal;

collecting, according to the interaction instruction, multi-media data of a video over at least one first preset time period, until a total time length of the collected multi-media data reaches a first preset length, wherein the video is broadcast by another electronic device;

determining time information associated with the collected multi-media data when the collecting spans the first preset time period;

sending the multi-media data and the time information to a server through a network, wherein the multi-media data of the video during a time indicated by the time information comprises an audio signal and one or more images, and further wherein:

the server identifies a public identifier of a public person from the audio signal or the one or more images; and the multi-media data and the time information are matched with a first interaction page by the server, the first interaction page being a chat page associated with the public identifier, wherein the chat page includes a corresponding set of multiple interaction operations;

receiving, from the server, the chat page associated with the public identifier;

displaying the chat page on the mobile terminal; and while displaying the chat page:
  detecting a user selection of one of the multiple interaction operations displayed in the chat page;
  sending, to the server, a first response corresponding to the user-selected interaction operation;
  receiving, from the server, a second response, wherein the server generates the second response based on the first response corresponding to the user-selected interaction operation; and
  updating the chat page according to the second response.

2. The method according to claim 1, wherein collecting the multi-media data of the video according to the interaction instruction comprises:
  generating an audio fingerprint corresponding to the audio signal, and using the audio fingerprint as the multi-media data related to the video.

3. A video-based interaction method performed by a server comprising a processor and memory storing program codes, wherein the processor executes the stored program codes to perform operations, comprising:
  acquiring, from a mobile terminal connected to the server through a network, multi-media data of a video and time information associated with the multi-media data, the multi-media data including an audio signal and one or more images, wherein the multi-media data is collected over at least one first preset time period, until a total time length of the collected multi-media data reaches a first preset length;
  identifying a public identifier of a public person from the audio signal and the one or more images;
  matching the multi-media data and the time information with a first interaction page, the first interaction page being a chat page associated with the public identifier, wherein the chat page includes a corresponding set of multiple interaction operations;
  sending, to the mobile terminal, the chat page associated with the public identifier, wherein the mobile terminal displays the chat page upon receiving the chat page from the server;
  receiving, from the mobile terminal, a first response corresponding to a user-selected interaction operation among a set of multiple interaction operations corresponding to the collected multi-media data;
  generating a second response based on the first response corresponding to the user-selected operations; and
  sending the second response to the mobile terminal, the second response including an update to the chat page.

4. The method according to claim 3, wherein:
  identifying the public identifier of the public person comprises:
  generating an audio fingerprint according to the audio signal, and identifying the public identifier of the public person that matches with the audio fingerprint.

5. The method according to claim 3, wherein:
  the multi-media data includes audio fingerprint related to the video; and
  identifying the public identifier of the public person comprises:
  identifying the public identifier of the public person that matches with the audio fingerprint.

6. A mobile terminal, comprising a processor and memory storing program code, wherein the processor executes the stored program code to:
  acquire an interaction instruction from a user of the mobile terminal;
  collect, according to the interaction instruction, multi-media data of a video over at least one first preset time period, until a total time length of the collected multi-media data reaches a first preset length, wherein the video is broadcast by another electronic device;
  determine time information associated with the collected multi-media data when the collecting spans the first preset time period;
  send the multi-media data and the time information to a server through a network, wherein the multi-media data of the video during a time indicated by the time information comprises an audio signal and one or more images, and further wherein:
    the server identifies a public identifier of a public person the audio signal or the one or more images;
    the multi-media data and the time information are matched with a first interaction page by the server, the first interaction page being a chat page associated with the public identifier, wherein the chat page includes a corresponding set of multiple interaction operations;
  receive, from the server, the chat page associated with the public identifier;
  display the chat page on the mobile terminal; and
  while displaying the chat page:
    detect a user selection of one of the multiple interaction operations displayed in the chat page;
    send, to the server, a first response corresponding to the user-selected interaction operation;
    receive, from the server, a second response, wherein the server generates the second response based on the first response corresponding to the user-selected interaction operation; and
    update the chat page according to the second response.

7. The mobile terminal according to claim 6, wherein collecting the multi-media data of the video according to the interaction instruction comprises generating an audio fingerprint corresponding to the audio signal, and using the audio fingerprint as the multi-media data related to the video.

8. A server, comprising a processor and a memory storing program code, wherein the processor executes the stored program code to:
  acquire, from a mobile terminal connected to the server through a network, multi-media data of a video and time information associated with the multi-media data, the multi-media data including an audio signal and one or more images, wherein the multi-media data is collected over at least one first preset time period, until a total time length of the collected multi-media data reaches a first present length;
  identify a public identifier of a public person from the audio signal and the one or more images;
  match the multi-media data and the time information with a first interaction page, the first interaction page being a chat page associated with the public identifier, wherein the chat page includes a corresponding set of multiple interaction operations;
  send, to the mobile terminal, the chat page associated with the public identifier, wherein the mobile terminal displays the chat page upon receiving the chat page from the server;
  receive, from the mobile terminal, a first response corresponding to a user-selected interaction operation among a set of multiple interaction operations corresponding to the collected multi-media data;

generate a second response based on the first response corresponding to the user-selected operations; and send the second response to the mobile terminal, the second response including an update to the chat page.

9. The server according to claim 8, wherein the multimedia data includes an audio fingerprint related to the video; and the processor further executes the stored program code to identify the public identifier of the public person that matches with the audio fingerprint.

* * * * *